United States Patent
Engleson et al.

(10) Patent No.: US 8,088,427 B2
(45) Date of Patent: Jan. 3, 2012

(54) SYSTEM FOR GLUTEN REPLACEMENT IN FOOD PRODUCTS

(75) Inventors: Jodi A. Engleson, Minneapolis, MN (US); Carrie A. Lendon, Minneapolis, MN (US); William A. Atwell, Champlin, MN (US)

(73) Assignee: Cargill, Incorporated, Wayzata, MN (US)

( * ) Notice: Subject to any disclaimer, the term of this patent is extended or adjusted under 35 U.S.C. 154(b) by 1129 days.

(21) Appl. No.: 11/891,911

(22) Filed: Aug. 13, 2007

(65) Prior Publication Data

US 2008/0038434 A1 Feb. 14, 2008

Related U.S. Application Data

(60) Provisional application No. 60/837,331, filed on Aug. 11, 2006, provisional application No. 60/843,290, filed on Sep. 8, 2006.

(51) Int. Cl.
*A21D 13/04* (2006.01)

(52) U.S. Cl. ........... 426/549; 426/94; 426/496; 426/550

(58) Field of Classification Search ........................ None
See application file for complete search history.

(56) References Cited

U.S. PATENT DOCUMENTS

| 4,235,939 | A | * | 11/1980 | Kimberly, Sr. | ................ 426/549 |
| 6,858,238 | B2 | * | 2/2005 | Lee et al. | ......................... 426/6 |

* cited by examiner

*Primary Examiner* — Lien Tran
(74) *Attorney, Agent, or Firm* — Edward L. Levine

(57) ABSTRACT

The present invention is a system for replacing gluten in food products. Preferably, the gluten replacement system of the present invention utilizes gluten-free ingredients that mimic the functions of gluten in a dough and in a final product made from the dough. The gluten replacement system can be used to formulate food products that are safe for consumption by those who have a gluten intolerance, allergy or sensitivity, or by those who follow a gluten-free diet. The present invention is also directed to a composition for making a gluten-free product. The composition preferably mimics the functions of gluten in a food product. This composition may include a gluten-free gas-retaining polymer and a gluten-free setting polymer, and it may also include a hydrocolloid or a starch, or both.

6 Claims, 19 Drawing Sheets
(3 of 19 Drawing Sheet(s) Filed in Color)

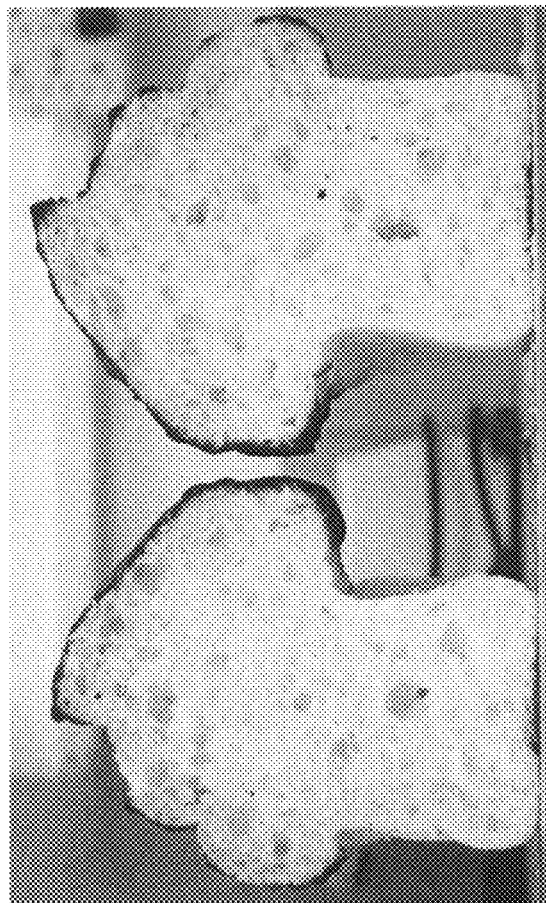
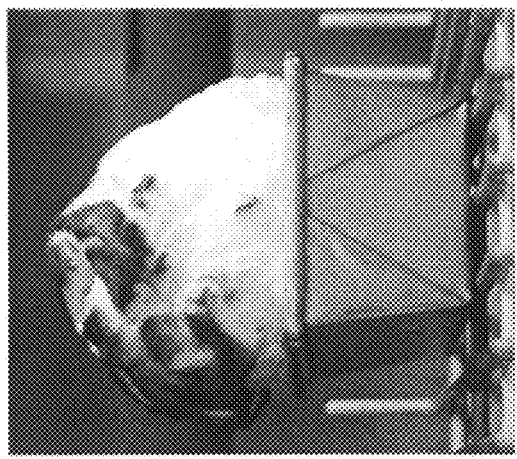
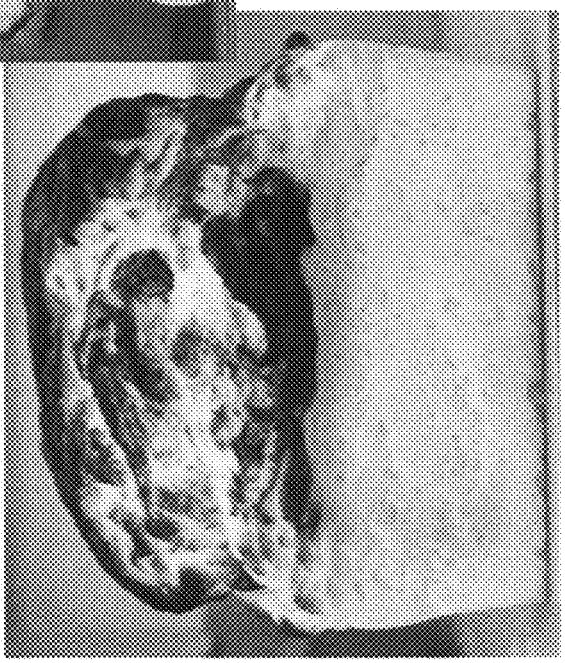
FIG. 2

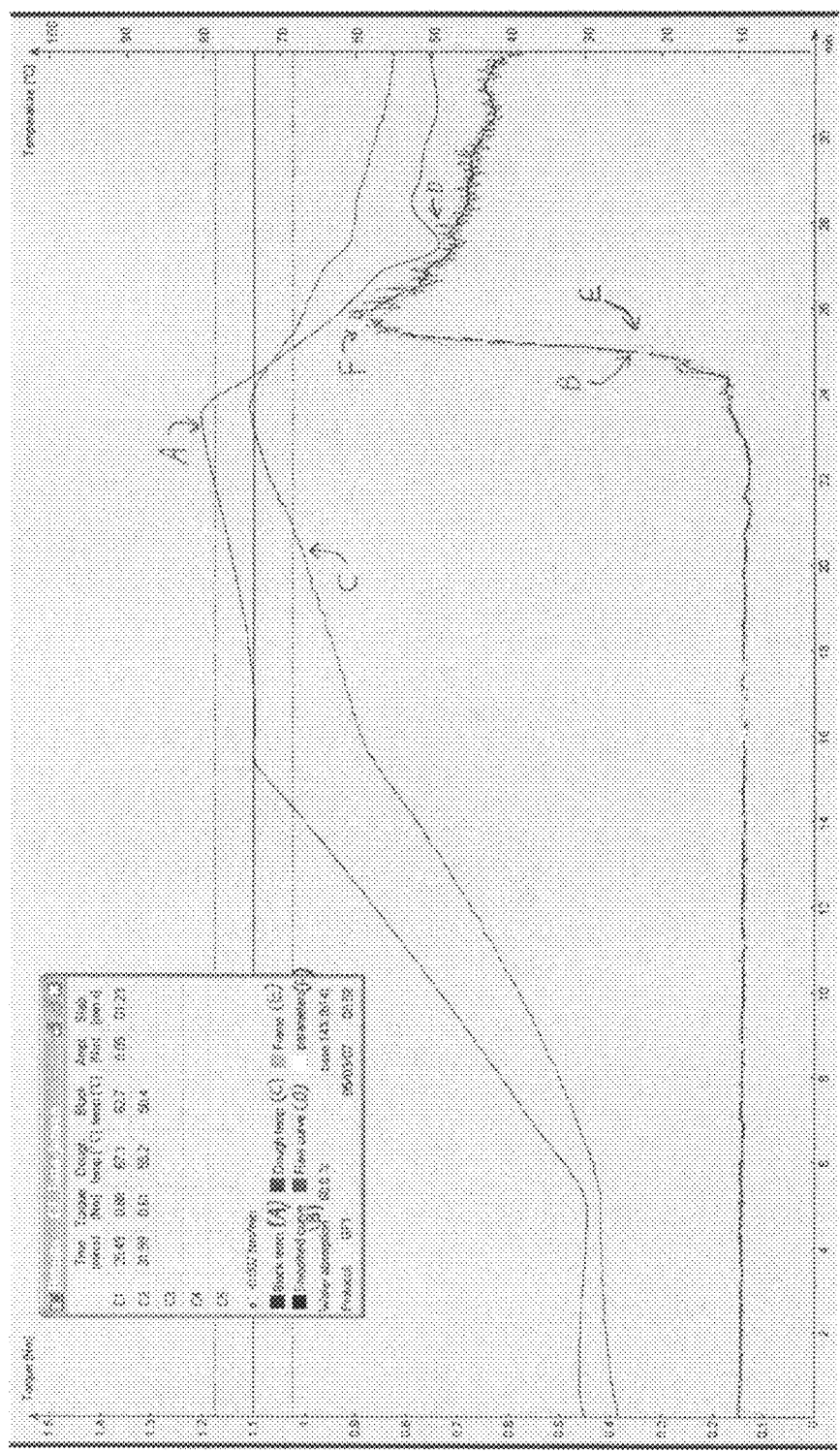

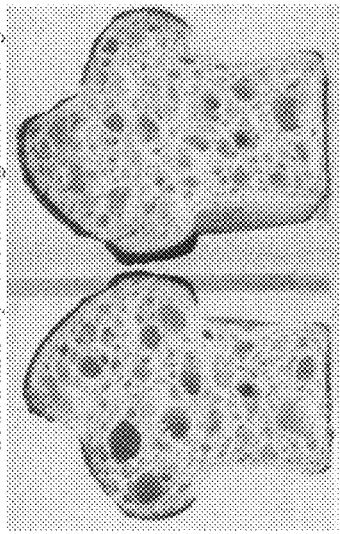 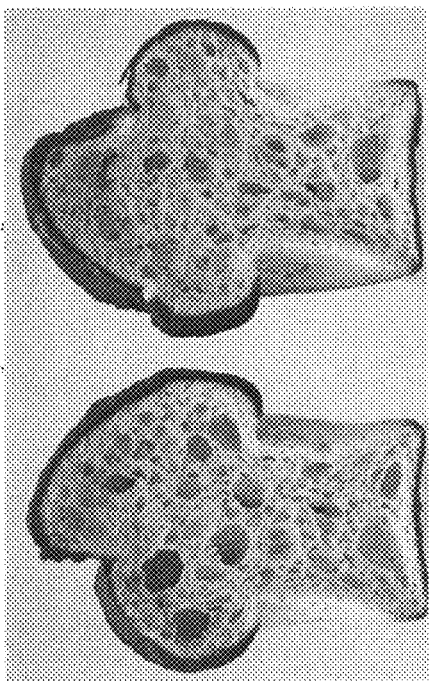
Fig. 4  Bread initially after Baking and Cooling    Bread 5 days after baking

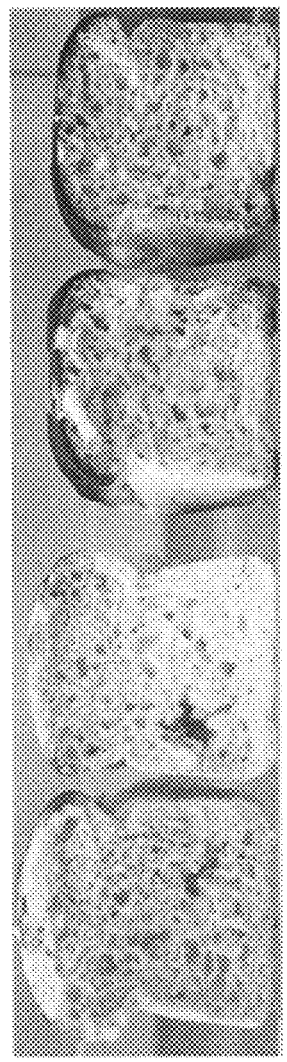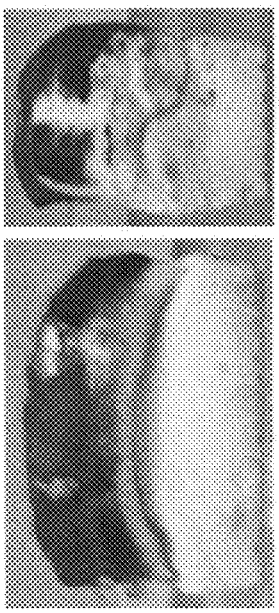

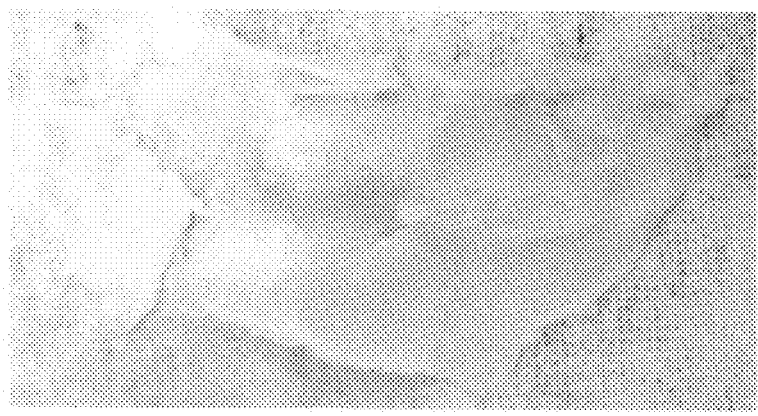
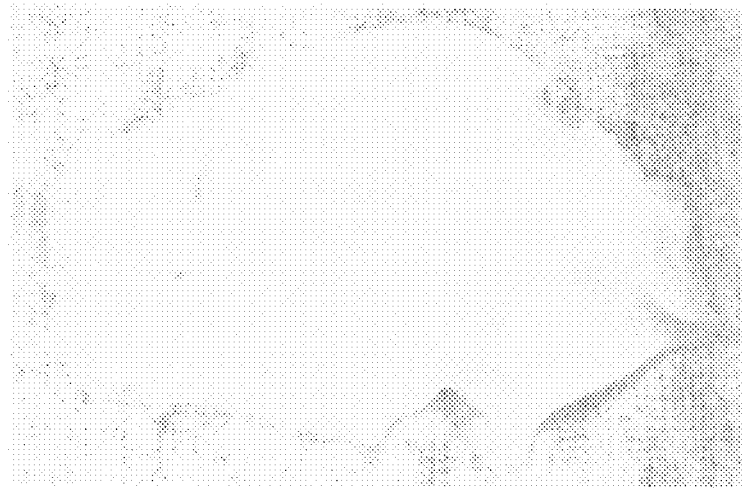
Fig. 11

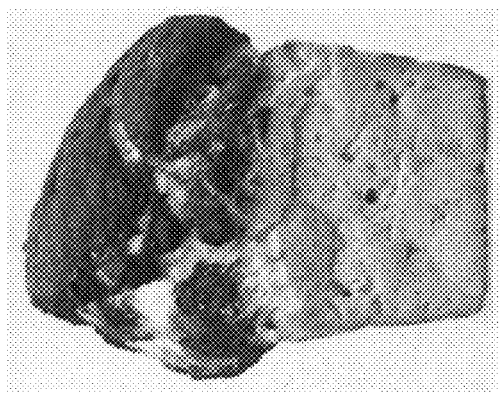
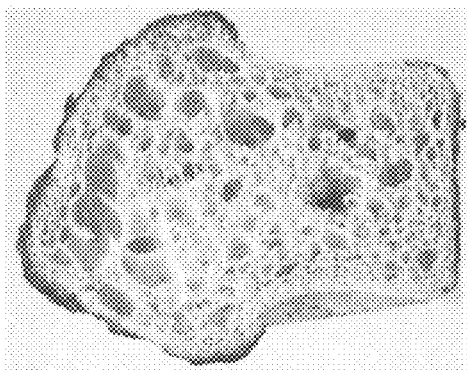
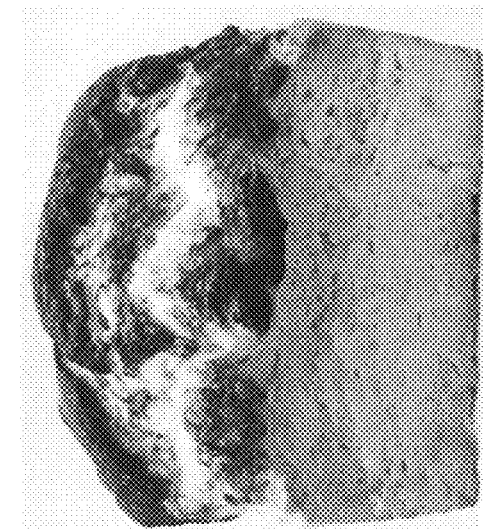
Fig. 12

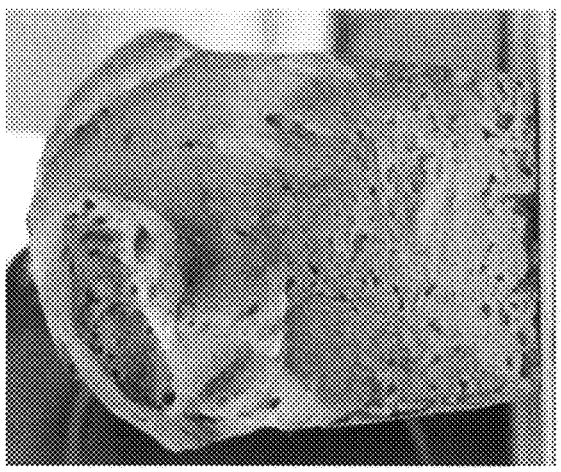
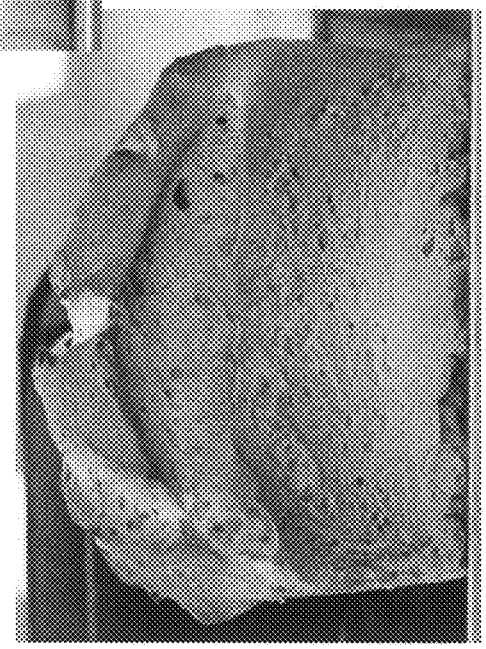
Fig. 16

Green bodies are ordered domains of chewing gum base.

SYSTEM FOR GLUTEN REPLACEMENT IN FOOD PRODUCTS

This application claims the benefit of priority of U.S. Provisional Application No. 60/837,331, filed on Aug. 11, 2006, and U.S. Provisional Application No. 60/843,290, filed on Sep. 8, 2006.

BACKGROUND

Gluten is a protein complex found in the triticeae tribe of grains, which includes wheat, barley and rye. The gluten content in wheat flour provides desirable organoleptic properties, such as texture and taste, to innumerable bakery and other food products. Gluten also provides the processing qualities familiar to both the home baker as well as the commercial food manufacturer. In short, gluten is considered by many to be the "heart and soul" of bakery and other food product.

However, gluten has its drawbacks. The gluten protein complex, upon entering the digestive tract, breaks down into peptide chains like other protein sources, but the resulting gluten-related peptide chain length is longer than for other proteins. For this and other reasons, in some people, these longer peptides trigger an immune response commonly referred to as celiac disease. Celiac disease is characterized by inflammation, villous atrophy and cryptic hyperplasia in the intestine. The mucosa of the proximal small intestine is damaged by an immune response to gluten peptides that are resistant to digestive enzymes. This damage interferes with the body's ability to absorb vital nutrients such as proteins, carbohydrates, fat, vitamins, minerals, and in some cases, even water and bile salts. If left untreated, celiac disease increases the risk of other disorders, such as anemia, osteoporosis, short stature, infertility and neurological problems, and has been associated with increased rates of cancer and other autoimmune disorders.

The early diagnosis of celiac disease, followed by treatment of celiac disease by eliminating gluten from the diet, leads to clinical and histologic improvement, thereby helping to reduce the probability that some of the associated, irreversible disorders will occur in a person diagnosed with celiac disease. A gluten-free diet is the mainstay of safe and effective treatment and management of celiac disease.

There are other medical reasons for following a gluten-free diet. People who are gluten-intolerant or gluten sensitive, which may include people diagnosed with Crohn's disease, ulcerative colitis, irritable bowel syndrome, dermatitis herpetiformis, or autism, are sometimes recommended or prescribed to follow a gluten-free diet. In addition, some people experience an IgE-mediated response or allergy to wheat protein. The prevalence of gluten as a potential allergen has resulted in the U.S. Food and Drug Administration being required to issue regulations regarding the definition and requirements in order for a product to be labeled "gluten-free" by 2008. Europe and Canada have regulations currently in effect which define "gluten-free" labeling for food products. Therefore, there is also a compelling need for a diet that would meet regulatory bodies' definitions of a "gluten-free" label.

Accordingly, there is an increasing need for gluten replacement systems in food products, which not only reduce or eliminate gluten in a product, but which also result in food products that are comparable to their gluten-containing counterparts. There are numerous gluten-free products on the market, but most of these products, such as gluten-free bakery products, have a poor taste and eating quality, provide poor nutrition, and are sold at a high price to the consumer.

Successful gluten replacement, therefore, provides a difficult challenge to the food manufacturer. This is due to the multi-faceted role that gluten plays as an ingredient in a vast array of food products.

One possible approach to making gluten-free food products is to remove the gluten from the gluten-containing ingredients. Examples of gluten-removing technologies are as follows:

Extraction using various solvents and solutions, such as ethanol, solutions of salts (including lithium chloride), and aqueous solutions of various pH;

Combined extraction/High Pressure Liquid Chromatography (HPLC) procedures;

Fractionation extraction;

Water washing (which is similar to extraction, and may be combined with precipitation);

Centrifugation and ultracentrifugation;

Enzyme treatments (such as enzyme-assisted hydrolysis);

Gluten recovery using sieves; and,

Emulsification/agglomeration.

There are many potential problems associated with attempting to remove gluten from gluten-containing ingredients. First, gluten may not be completely removed from the ingredients, resulting in levels of gluten which may be unacceptably high for patients with celiac disease. Second, the removal of gluten from some ingredients may result in the removal of the functional polymers that these ingredients require in order to bring structure to food products. Third, the expense associated with removing gluten from gluten-containing ingredients on a commercial scale may result in food product prices that are unacceptably high for consumers.

Fourth, incomplete clean-up following extraction procedures may leave deleterious substances in the ingredients. Some extraction solvents and solutions are not safe for human consumption. Moreover, even extraction solvents and solutions that are safe for human consumption may leave unpleasant flavors or aromas in the food ingredients, or may lead to other unwanted results. For example, the incomplete removal of ethanol could depress yeast activity, and the changes in pH caused by certain extraction solvents or solutions could affect gelatinization temperatures.

A typical method for making gluten-free food products consists of using only ingredients derived from gluten-free starting materials. For instance, a bakery product may be made using a flour derived from a gluten-free food source, such as garbanzo beans, rather than a flour derived from a gluten-containing grain, such as wheat. Examples of gluten-free flours that may be used to make gluten-free bakery products are as follows: amaranth flour, arrowroot flour, brown rice flour, buckwheat flour, corn flour, cornmeal, garbanzo bean flour, garfava flour (a flour produced by Authentic Foods which is made from a combination of garbanzo beans and fava beans), millet flour, oat flour, potato flour, quinoa flour, Romano bean flour, sorghum flour, soy flour, sweet rice flour, tapioca flour, teff flour, and white rice flour. However, this is not a comprehensive list of all flours that may be used to make gluten-free bakery products. Frequently, different gluten-free flours are combined to make a bakery product.

Examples of other possible ingredients in gluten-free bakery products, besides gluten-free flours, are as follows: starches, including potato starch and cornstarch; gums, including xanthan gum and guar gum; gelatin; eggs; egg replacers; sweeteners, including sugars, molasses, and honey; salt; yeast; chemical leavening agents, including baking powder and baking soda; fats, including margarine and butter; oils, including vegetable oil; vinegar; dough enhancer; dairy products, including milk, powdered milk, and yogurt;

soy milk; nut ingredients, including almond meal, nut milk, and nut meats; seeds, including flaxseed, poppy seeds, and sesame seeds; fruit and vegetable ingredients, including fruit puree and fruit juice; and flavorings, including rye flavor powder, vanilla, cocoa powder, and cinnamon. However, this is not a comprehensive list of all ingredients that can be used to make gluten-free bakery products.

Most approaches to formulating gluten-free products involve the use of starches, dairy products, gums and hydrocolloids, and other non-gluten proteins. These materials tend to be hydrophilic and thus may require excessive amounts of water; in fact, the unbaked material is often a batter that is poured into the pan. During baking, the high water content leads to more fully pasted starch and in turn a more brittle, crumbly final texture and a shorter, less chewy bite. In some cases the final product is even starch continuous, which is the opposite of gluten-containing bread.

Gluten is a cohesive protein mass containing primarily two groups of protein subunits—the lower molecular weight monomeric gliadins, having a molecular weight of between about 30,000 to about 125,000, and the higher molecular weight polymeric glutenins, having a molecular weight of between about 100,000 to 3,000,000 or higher.

Gluten contains both hydrophilic and hydrophobic amino acids, giving the protein mass both properties. Upon hydration, gliadins are viscous and extensible—they flow with gravity. As a result, gliadins are often considered plasticizers. Glutenins, on the other hand, upon hydration become very elastic, that is, they have a memory and are capable of returning to the original shape or approximately the original shape following deformation. This combination of properties of gluten imparts the cohesive and viscoelastic properties of a dough containing gluten, and provides the dough with gas-holding properties beneficial for successfully making bakery products.

The protein composition of gluten also includes both ordered and random regions, short and long chain proteins, and linear and branched chains. This combination of opposing properties makes gluten an important component of the manufacturing and final qualities of bakery products, and is why it has been so difficult to replace gluten with other ingredients and still produce a suitable final bakery product.

Gluten-containing bakery products begin with a gluten-containing dough. To make the dough, the ingredients are mixed with a liquid, such as water, and the continued mixing of the dough creates gas cells in the dough. As a result of mixing, the hydrated gluten forms a continuous phase in the dough, which encapsulates and stabilizes the gas cells created in the dough. When the leavening agent in the bakery product begins to generate carbon dioxide, the carbon dioxide first dissolves into the liquid phase of the dough, but upon saturation of the liquid phase, enters into the gas cells, causing the cells to expand. Gluten provides the necessary strength and flexibility to stabilize the gas cells as they expand.

When a dough containing gluten is baked, the temperature and volume of the dough begin to increase with time, until the volume reaches a plateau. As baking progresses, there is a major change in the water balance of the bread system. The starch gelatinizes and becomes hygroscopic. Amylose exudes from the starch granules; however, the granules remain largely intact because water is limited and unable to fully paste the starch. Gas cells become larger because the volume that a gas occupies is related to its temperature. This stretches the gluten, which enables the gluten polymers to align, and in turn, strain harden. Eventually the system fails and the cells break, resulting in a bicontinuous bread system; the air and gluten are continuous and the starch is discontinuous. With zero pressure gradient, the bread does not collapse. Upon cooling, the viscosity of the starch gel in the crumb increases and the structure sets. The continuous, polymerized and strain-hardened nature of the gluten and the discontinuous nature of the starch provide the final bread structure having a desirable specific volume and chewy texture.

Gluten, therefore, is a very dynamic component of a bakery product system. In its hydrated form in a dough, gluten forms the viscoelastic gas-retaining matrix that is needed in order for the dough to attain the characteristics that will result in a successful bakery product. To achieve the final bread structure, a physical strain hardening and a chemical cross-linking or polymerization occurs. Upon baking or other types of heating, gluten loses moisture, becomes polymerized, and strain hardens, thereby setting the texture and volume of the bakery product.

SUMMARY OF INVENTION

The present invention is directed to a system for replacing gluten in food products. Preferably, the gluten replacement system of the present invention overcomes the typical problems associated with formulating gluten-free food products, by utilizing gluten-free ingredients that mimic the functions of gluten in a dough and in a final product made from the dough. The gluten replacement system of the present invention can also be used in combination with gluten-removing technologies if they are deemed safe and effective.

Gluten, as described above, is a dynamic component in a product, and the present invention is directed to providing a dynamic gluten replacement system that results in high quality, good tasting products that are comparable to their gluten-containing counterparts. The gluten replacement system in accordance with the present invention is useful for the treatment or management of celiac disease, and is safe for consumption by those with a gluten-intolerant disorder, by those who in general have a gluten intolerance, allergy or sensitivity, or by those who have been placed on or choose to follow a gluten-free diet for medical or non-medical reasons. The present invention therefore can also be directed to the treatment or management of symptoms associated with gluten-intolerant, gluten sensitive or gluten allergic disorders by using the gluten replacement system of the present invention or by using gluten-free products made with the gluten replacement system of the present invention.

The present invention is directed to a composition for making a gluten-free product. The composition preferably mimics the functions of gluten in a food product. This composition may include a gluten-free gas-retaining polymer and a gluten-free setting polymer. The composition may also include a hydrocolloid or a starch, or both.

The present invention is also directed to a food product containing a composition for making a gluten-free product. The present invention is also directed to a premix that can be used to make a gluten-free product.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 shows end and cross-sectional views of a loaf of bread made with a hydrocolloid and a starch FIG. 3 is a MIXOLAB™ curve of a batter made with a hydrocolloid and a starch.

FIG. 4 shows cross-sectional views of a loaf of bread made with tapioca starch and ethanol-solubilized zein. Cross-sectional views of the bread initially after baking and cooling, and of the bread five days after baking, are shown.

FIG. 5 shows end, side, and cross-sectional views of loaves of bread made with tapioca starch and high amylose starch, and cross-sectional views of a loaf of bread made with tapioca starch and modified starch.

FIG. 11 shows views of pellets obtained after centrifugation of a bread made with xanthan gum, a bread made with PERMSOFT™ chewing gum base and zein, and a commercial WONDER® Classic white bread.

FIG. 13 shows end, side, and cross-sectional views of a loaf of bread made with natural chicle chewing gum base.

FIG. 16 shows end, side, and cross-sectional views of a loaf of yeast-leavened bread.

FIG. 18a is an image of WONDER® Classic white bread, and FIG. 18b is an image of Levain artisan bread (Rustica, L.L.C., Minneapolis, Minn. US).

DETAILED DESCRIPTION

Figure 1:
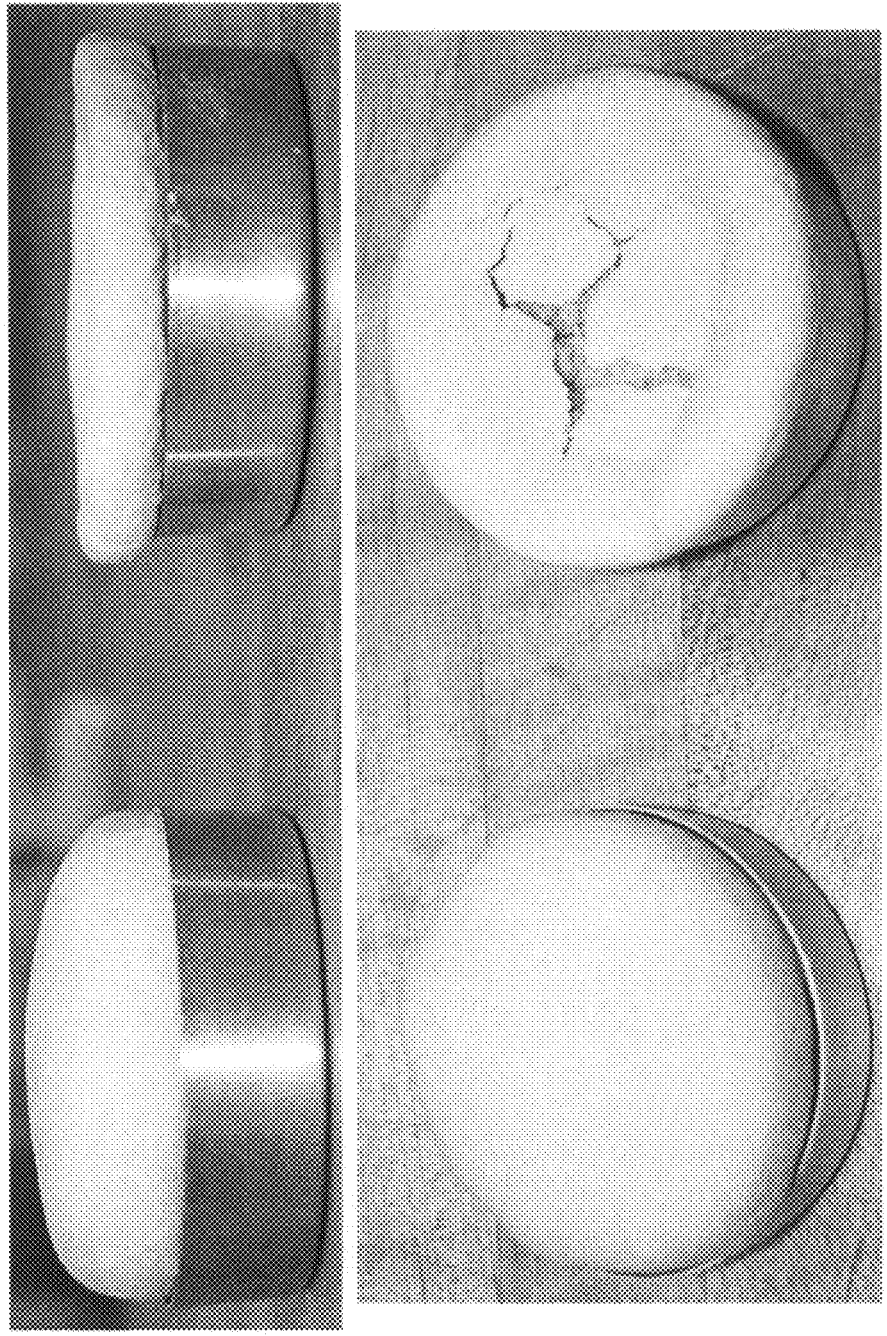
FIG. 1 shows perspective and side views of a loaf of bread treated with ethanol solubilized zein, and perspective and side views of a control loaf of bread which was not treated with ethanol solubilized zein.

The present invention is directed to the use of polymers having a variety of properties to replace gluten in a food product, such as, but not limited to, a bakery product. Preferably, the polymers include a gas-retaining agent and a setting agent, as will be described in more detail below.

The gas-retaining agent preferably mimics the gas retaining properties typically imparted to a dough and the food product by its gluten content, so that carbon dioxide generated by the leavening agent in the dough is retained within the gas cells. The gas-retaining agent also preferably permits the gas cells to expand as more carbon dioxide enters the cells and as the gas expands upon heating.

The setting agent preferably mimics the effects of gluten strain hardening upon an increase in temperature and concomitant moisture loss in the product.

It is believed that many polymers, including, but not limited to, those listed below, can impart gas-retaining properties similar to those observed in a gluten-containing dough and food product. Gas-retaining agents can include any variety of polymers, including but not limited to hydrophilic polymers, hydrocolloids and pregelatinized starches, and the like. Preferably, these polymers have hydrophobic properties.

Polymers with Gas-Retaining Properties
  Butadiene-styrene rubber
  Isobutylene-isoprene copolymer (butyl rubber)
  Paraffin
  Petroleum wax
  Petroleum wax synthetic
  Polyethylene polyisobutylene
  Polyvinyl acetate
  Poly-1-vinylpyrrolidone-co-vinyl acetate copolymer
  Polyvinyl alcohol
  Polyethylene glycol
  Polyethylene oxide
  Polyacrylic acid
  Sapotaceae [chicle, chiquibul, crown gum, gutta hang kang, massaranduba balata, massaranduba chocolate, nispero, rosidinha (rosadinha) and Venezuelan chicle],
  Apocynaceae [jelutong, leche caspi (sorva), pendare and perillo]
  Moraceae [leche de vaca, niger gutta and tunu (tuno)]
  Euphorbiaceae (chilte and natural rubber)

The gas-retaining agents listed above may require the use of a setting agent in order to provide the product with the appropriate structure when the product temperature is increased, such as by baking. Setting agents can include any variety of polymers, including but not limited to hydrophilic polymers, hydrocolloids, high amylose or modified starches, and the like. Preferably, these polymers have hydrophobic properties and/or contain species that dehydrate. A few examples of setting agents are listed below.

Polymers with Setting Properties
  Polylactic acid
  Polyvinyl alcohol
  Corn zein
  Polycaprolactone Other suitable polymers include those with both gas-retaining and setting properties. These polymers preferably have both hydrophilic and hydrophobic properties, to more closely resemble the unique properties of gluten.

In addition to the gas-retaining agent and the setting agent, it is preferable to use other conventional dough ingredients, such as softeners, including soybean oil, plasticizers, such as glycerol, and emulsifiers, such as lecithin, in order to obtain a suitable cohesive mass comparable to a gluten-containing dough.

The present invention can be directed to a gluten replacement system that can be used to prepare high quality, good tasting gluten-free products. Although the following example describes the preparation of a gluten-free bread product, other bakery products such as gluten-free muffins, cakes, cookies and other gluten-free bakery products are contemplated by the present invention. In addition to gluten-free bakery products, other gluten-free versions of baked products, and products typically made with grains from the triticeae family, such as gluten-free pasta, crackers, pizza crust, bars, cereal and the like are also within the scope of the present invention.

The bread or similar bakery products made with the gluten replacement system of the present invention preferably have properties comparable to those of their gluten-containing counterparts, i.e., similar products made with wheat flour containing gluten. Preferably, the gluten-free products of the present invention have a specific volume of about 3.0 cc/g or higher, although not so high as to result in the product collapsing. More preferably, the products of the present invention have specific volumes of about 4.0 cc/g or higher, and particularly preferred are those products having specific volumes in the range of about 4.0 cc/g to about 6.0 cc/g.

Similarly, it is preferred that the gluten-free products of the present invention have a chewiness, as determined by texture profile analysis, approaching 100 g, and a gumminess of between about 100-150 g.

EXAMPLE 1

Chewing Gum Base and Corn Zein

A gluten-free bread was produced in accordance with the present invention, using the formula of Tables 1 and 2. The formula of the softened chewing gum base listed in Table 2 is provided in Table 1. The gas-retaining agent was a chewing gum base, and the setting agent was corn zein.

TABLE 1

Softened Chewing Gum Base

| Ingredient | Mass (g) |
| --- | --- |
| Chewing gum base (PERMSOFT ™ chewing gum base, Cafosa, S.A.U., Barcelona, Spain) | 18 |
| Soybean oil (Cargill, Inc., Wayzata, MN, US) | 3 |
| Lecithin (LECIPRIME ™ lecithin, Cargill, Inc., Wayzata, MN, US) | 0.9 |

TABLE 2

| Ingredient | Mass (g) |
| --- | --- |
| Corn zein[1] (Freeman Industries LLC, Tuckahoe, NY, US) | 6 |
| 75% Aqueous ethanol (EVERCLEAR ® alcohol, Luxco, Inc., St. Louis, MO, US) | 6 |
| Salt (Cargill, Inc., Wayzata, MN, US) | 0.1 |
| Sugar (Cargill, Inc., Wayzata, MN, US) | 0.1 |
| Softened chewing gum base (made according to formula of Table 1) | 7 |
| Starch[2] (AYTEX ® P wheat starch, Archer Daniels Midland Company, Decatur, IL, US) | 30-40 |
| Glucono delta-lactone (GDL) (PURAC America Inc., Lincolnshire, IL, US) | 1-3 |
| Sodium bicarbonate (Church and Dwight Co., Inc., Princeton, NJ, US) | 1-3 |
| Water | 30-40 |

[1]White zein (either from white maize or solvent extracted) is also available from companies like Freeman Industries LLC, but it is more difficult to procure.
[2]Codex wheat starch (wheat starch meeting the standard for gluten-free foods set by the Codex Alimentarius Commission) can be substituted for AYTEX ® P wheat starch.

To prepare the softened chewing gum base, the chewing gum base was melted. Soybean oil and lecithin were added to emulsify and soften the melted gum base, and these ingredients were stirred until combined. Other plasticizers for chewing gum base may include dibutyl sebacate, diethyl phthalate, acetyl tributyl citrate, acetylated mono- and di-glycerides, fully or partially hydrogenated vegetable oils, fully or partially hydrogenated animal fats, and natural and petroleum waxes.

In a separate beaker, the corn zein was dissolved in EVERCLEAR® alcohol. Salt and sugar were added to the zein solution with vigorous stirring.

Approximately 7 g of the softened chewing gum base was added to the zein solution, and the resulting combination was stirred vigorously to result in a homogeneous mixture. Cold water was then added to form a soft resin as a result of the corn zein precipitating in the presence of cold water. The resin had viscoelastic properties at ambient conditions. The resin formed a film upon bilateral extension.

Prior to heating the resin, 30-40 g of starch and water were added in an amount to result in a dough having a final mass of about 80-100 g. The ingredients were mixed until a gluten-like film occurred in the dough upon bilateral extension. Near the end of the mixing stage, glucono delta-lactone and sodium bicarbonate were added as chemical leavening agents. Approximately 20 g of dough were placed in a pan, so that the dough reached to approximately half the height of the pan. The panned dough was proofed for 15 minutes at 115° F. and 95% relative humidity, causing the dough to rise above the top of the pan. The proofed dough was then baked at 425° F. for 5 minutes. The dough was able to retain gas and expand upon initial heating, and was able to set upon further heating.

The resulting bread product had a specific volume of 3.8-4.0 cc/g, and had a chewy texture similar to a gluten-containing bread. The bread product remained soft when stored in a closed plastic bag at ambient conditions.

A control bread, which was prepared without ethanol solubilized zein, was compared to the bread made according to the formula of Table 1, wherein the dough was treated with ethanol solubilized zein. FIG. 1 shows photographs of both the control bread and the treated bread. The control bread proofed like the treated bread, but collapsed midway through the baking process.

The chewing gum base suitable for use in the composition of the present invention can be any chewing gum base as defined in 21 C.F.R. §172.615, which is incorporated herein by reference. The corn zein suitable for use in the composition of the present invention is the water-insoluble prolamine protein obtained from corn.

Viscosity

The balancing of the gas-retaining and setting properties, and the hydrophobic and hydrophilic characteristics, of various gluten-replacing ingredients results in high quality gluten-free products that have the desired specific volume, texture and other properties associated with gluten-containing products.

Many of these gluten-replacing ingredients affect the viscosity of the dough or batter, and it is believed that achieving a suitable viscosity during mixing and proofing results in a desirable end product. A preferred viscosity enables gas to diffuse into existing gas cells as opposed to out of the dough or batter matrix, minimizes gas cell coalescence caused by surface tension, and reduces or prevents the dough or batter from flowing over the pan during proofing.

Hydrocolloids

As used herein, the term "hydrocolloids" shall be used to describe non-starch hydrophilic materials that are dispersible in water. They are often used as emulsifiers, thickeners, or viscosifiers in food products. Hydrocolloids are able to increase viscosity in aqueous systems, due to their ability to absorb water.

In general, hydrocolloids are classified as linear or branched. Both linear and branched hydrocolloids are either neutral or charged. The following materials are examples of linear and neutral hydrocolloids: microcrystalline cellulose, methyl cellulose, hydroxypropyl methyl cellulose, hydroxypropyl cellulose, amylose, guar, locust bean gum, tara, and konjac. The following materials are examples of linear and charged hydrocolloids: pectin, low ester pectin, alginate, propylene glycol alginate, carrageenan, agar, xanthan gum, gellan gum, and carboxymethyl cellulose (cellulose gum). The following materials are examples of branched and charged hydrocolloids: gum arabic, tragacanth, and karaya. Amylopectin is an example of a branched and neutral hydrocolloid.

Hydrocolloids that may be suitable for use in the composition of the present invention include, but are not limited to, xanthan gum, hydroxypropyl methyl cellulose, methyl cellulose, carboxymethyl cellulose (cellulose gum), guar gum, locust bean gum, pectin, low ester pectin, alginate, propylene glycol alginate, carrageenan, agar, gellan gum, mycrocrystalline cellulose, hydroxypropyl cellulose, amylose, tara, konjac, and combinations thereof.

It has been found that certain viscosity-building hydrocolloids, such as xanthan gum, hydroxypropyl methyl cellulose, and the like can be used in combination with starch as a gluten-replacement system to result in a suitable gluten-free bakery product. Starches that can be used include gluten-free or Codex wheat starch, corn starch, high amylose starch, tapioca starch, rice starch, and the like. The resulting products have an excellent specific volume, crumb structure and appearance. Example 2 describes the use of various hydrocolloids in combination with a starch as the gluten replacement system of the present invention.

EXAMPLE 2

Hydrocolloid Treatment

A batter was prepared according to the formula of Table 3. The ingredients, except for the chemical leavening agents, were mixed for 3 minutes on high speed in a KITCHENAID™ Classic mixer with a paddle. The chemical leavening agents were then added, and the batter was mixed on high speed for an additional 3 minutes. The resulting batter was sticky.

Approximately 220 g of batter were poured into a pup loaf pan. The batter was proofed to approximately 1 inch above the top of the pan, at 115° F. and 85% relative humidity. The batter was then baked for 30 minutes at 430° F.

The combination of water, starch, and hydrocolloid produced a batter that was surprisingly able to proof to height and yield a significant amount of oven spring. The resulting bread had a specific volume of 6.4 cc/g, and a set crumb structure (FIG. 2).

The final product had a crumb structure very much like bread; however, it lacked a chewy texture and fell apart easily in the mouth. The bread was soft and stable after 24 hours in a plastic bread bag.

A batter prepared according to the formula of Table 3 was analyzed using a MIXOLAB™ mixer, which is a mixer that can be used to measure the viscosity and gelatinization of a batter or dough. The MIXOLAB™ mixer is commercially available from Chopin Technologies, Villeneuve-la-Garenne, France. The following protocol was used to conduct the MIXOLAB™ analysis:

85 g dough
Protocol:
Mixing speed: 80 rpm
Tank temp: 30° C.
  1. Start test, hold at 30° C. for 5 minutes
  2. $1^{st}$ gradient: heat to 90° C. at a rate of 6 degrees/minute
  3. Hold for 7 minutes at 90° C.
  4. $2^{nd}$ gradient: cool to 50° C. at a rate of −8 degrees/minute
  5. Hold for 5 minutes at 50° C.
Total analysis time: 32 minutes A MIXOLAB™ curve for this batter is shown in FIG. 3. The data suggest that although the hydrocolloids are able to provide adequate proofing and result in a product with sufficient starch gelatinization, additional functional ingredients are needed to provide other attributes associated with gluten-containing products.

TABLE 3

Hydrocolloid Treatment with no Chewing Gum Base and no Aqueous Zein

| Ingredient | Percent | Mass (g) |
|---|---|---|
| Salt (Cargill, Inc., Wayzata, MN, US) | 0.13 | 0.80 |
| Sugar (Cargill, Inc., Wayzata, MN, US) | 0.13 | 0.80 |
| Starch* (AYTEX ® P wheat starch, Archer Daniels Midland Company, Decatur, IL, US) | 37.87 | 240.00 |
| Glucono delta-lactone (GDL) (PURAC America Inc., Lincolnshire, IL, US) | 2.52 | 16.00 |
| Sodium bicarbonate (Church and Dwight Co., Inc., Princeton, NJ, US) | 1.26 | 8.00 |
| Water | 53.65 | 340 |
| Ammonium bicarbonate (Church and Dwight Co., Inc., Princeton, NJ, US) | 0.31 | 2.00 |
| Soybean oil (Cargill, Inc., Wayzata, MN, US) | 1.68 | 10.68 |
| Lecithin (LECIPRIME ™ lecithin, Cargill, Inc., Wayzata, MN, US) | 0.50 | 3.20 |
| Xanthan Gum (KELTROL ® HP, CP Kelco, Chicago, IL, US) | 1.58 | 10.00 |
| Diacetyl tartaric acid esters of mono- and diglycerides (Danisco, Ardsley, NY, US) | 0.16 | 1.00 |
| Azodicarbonamide ADA-PAR (BENCHMATE ™, Burns Philp Food Inc., Fenton, MO, US) | 0.02 | 0.10 |
| Ascorbic Acid PAR-C-120 (BENCHMATE ™, Burns Philp Food Inc., Fenton, MO, US) | 0.02 | 0.10 |
| Sodium stearoyl lactylate (Archer Daniels Midland Company, Decatur, IL, US) | 0.16 | 1.00 |
| Total | 100.00 | 633.68 |

*Codex wheat starch can be substituted for AYTEX ® P wheat starch.

Hydrocolloids and Hydrophobic Ingredients

When there is a high level of a viscosifier, like a hydrocolloid and/or modified or high amylose starch, present in the product, the product may not have a proper chewy texture resembling that of a gluten-containing product. It was found that a combination of hydrocolloids and hydrophobic functional ingredients gave the optimal performance, resulting in a bread with a proper chewy texture. Balancing hydrophilic and hydrophobic ingredients may also lead to longer shelf life.

Combining relatively high levels of viscosifying hydrocolloids with the other polymeric gas-retaining and setting agents described above results in a gluten-free bakery product with a desired specific volume, crumb structure, appearance, and chewiness associated with gluten-containing bakery products. It is believed that the inclusion of hydrocolloids helps to stabilize the gas cells in the dough, and reduce the rate of diffusion of gas out of the dough, and the hydrophobic properties of the polymers provide the desired textural properties in the finished product.

produced satisfactory bread with respect to specific volume and set crumb, suggesting that a pure viscosifier alone rather than a charged hydrocolloid alone or viscosifier/charged hydrocolloid combination was sufficient to trap gas in the matrix and set the baked bread.

It was also discovered that the crumb structure of the gluten-free products could be made finer by adding a punch step as follows: after the batter is proofed for 1 hour at 115° F. and 85% relative humidity, the batter is then punched-down manually using the mixer paddle, an additional 16 g of glucono delta-lactone and 8 g of sodium bicarbonate are added to the entire batter and mixed on medium speed for 1 minute, and 220 g of batter are poured into a pup loaf pan and proofed and baked as described. The addition of the punch step and additional leavening agents produced baked products with desirable specific volumes and finer crumb structures as compared to similar products made without the punch step.

TABLE 4

Hydrocolloid Ingredients

| Hydrocolloid Ingredient | Treatment 1 | | Treatment 2 | | Treatment 3 | | Treatment 4 | | Treatment 5 | |
|---|---|---|---|---|---|---|---|---|---|---|
| | % | Mass (g) | % | Mass (g) | % | Mass (g) | % | Mass (g) | % | Mass (g) |
| HPMC (METHOCEL® K4M, Dow Chemical Co., Midland, MI, US) | 0.00 | 0.00 | 0.64 | 5.00 | 0.00 | 0.00 | 0.00 | 0.00 | 0.00 | 0.00 |
| MC (METHOCEL® A4M, Dow Chemical Co., Midland, MI, US) | 0.00 | 0.00 | 0.00 | 0.00 | 0.64 | 5.00 | 0.00 | 0.00 | 1.28 | 10.00 |
| Xanthan Gum (KELTROL® HP, CP Kelco, Chicago, IL, US) | 1.28 | 10.00 | 0.64 | 5.00 | 0.64 | 5.00 | 0.00 | 0.00 | 0.00 | 0.00 |
| Guar (TIC PRETESTED® Guar, Tic Gums, Belcamp, MD, US) | 0.00 | 0.00 | 0.00 | 0.00 | 0.00 | 0.00 | 1.28 | 10.00 | 0.00 | 0.00 |
| Total | 1.28 | 10.00 | 1.28 | 10.00 | 1.28 | 10.00 | 1.28 | 10.00 | 1.28 | 10.00 |

Example 3 describes the effects of adding a hydrocolloid to the polymeric gas-retaining and setting system in order to replace the gluten in a bakery product in accordance with the present invention.

EXAMPLE 3

Chewing Gum Base, Corn Zein and Hydrocolloids

The following hydrocolloid treatments were evaluated, as listed in Table 4: 1) 10 g xanthan gum, 2) 5 g xanthan gum and 5 g hydroxypropyl methylcellulose (HPMC) (METHOCEL® K4M), 3) 5 g xanthan gum and 5 g methylcellulose (MC) (METHOCEL® A4M), 4) 10 g guar, and 5) 10 g methylcellulose (MC) (METHOCEL® A4M). All 5 treatments The ingredients of the dough that were mixed with the hydrocolloid ingredients are listed in Tables 5 and 6. The hydrocolloid treated breads were prepared as follows. To prepare the softened chewing gum base, the chewing gum base was melted completely at 200-250° C. Soybean oil and lecithin were added to emulsify and soften the melted gum base, and these ingredients were stirred until combined.

TABLE 5

Softened Chewnig Gum Base

| Ingredient | Percent | Mass (g) |
|---|---|---|
| Chewing gum base (PERMSOFT ™ chewing gum base, Cafosa, S.A.U., Barcelona, Spain) | 82.20 | 64.10 |
| Soybean oil (Cargill, Inc., Wayzata, MN, US) | 13.69 | 10.68 |

TABLE 5-continued

Softened Chewnig Gum Base

| Ingredient | Percent | Mass (g) |
|---|---|---|
| Lecithin (LECIPRIME ™ lecithin, Cargill, Inc., Wayzata, MN, US) | 4.11 | 3.20 |
| Total | 100.00 | 77.98 |

TABLE 6

Ingredients Mixed with the Hydrocolloid Ingredients of Table 4

| Ingredient | Percent | Mass (g) |
|---|---|---|
| Corn zein (Freeman Industries LLC, Tuckahoe, NY, US) | 6.12 | 47.90 |
| 75% Aqueous ethanol (EVERCLEAR ® alcohol, Luxco, Inc., St. Louis, MO, US) | 6.12 | 47.90 |
| Salt (Cargill, Inc., Wayzata, MN, US) | 0.10 | 0.80 |
| Sugar (Cargill, Inc., Wayzata, MN, US) | 0.10 | 0.80 |
| Softened chewing gum base (from Table 5) | 8.56 | 67.00 |
| Starch* (AYTEX ® P wheat starch, Archer Daniels Midland Company, Decatur, IL, US) | 30.67 | 240.00 |
| Glucono delta-lactone (GDL) (PURAC America Inc., Lincolnshire, IL, US) | 2.04 | 16.00 |
| Sodium bicarbonate (Church and Dwight Co., Inc., Princeton, NJ, US) | 1.02 | 8.00 |
| Water | 43.44 | 340 |
| Ammonium bicarbonate (Church and Dwight Co., Inc., Princeton, NJ, US) | 0.26 | 2.00 |
| Diacetyl tartaric acid esters of mono- and diglycerides (Danisco, Ardsley, NY, US) | 0.13 | 1.00 |
| Azodicarbonamide ADA-PAR (BENCHMATE ™, Burns Philp Food Inc., Fenton, MO, US) | 0.01 | 0.10 |
| Ascorbic Acid PAR-C-120 (BENCHMATE ™, Burns Philp Food Inc., Fenton, MO, US) | 0.01 | 0.10 |
| Sodium stearoyl lactylate (Archer Daniels Midland Company, Decatur, IL, US) | 0.13 | 1.00 |
| Total | 98.72 | 772.6 |

*Codex wheat starch can be substituted for AYTEX ® P wheat starch.

The corn zein, salt, and sugar were dissolved in EVERCLEAR® alcohol, and combined with softened chewing gum base. Cold water was then added to precipitate the softened chewing gum base and zein, until the material was no longer sticky (approximately 2 minutes). The remaining ingredients were then added, and the combination was mixed for 3 minutes on high speed in a KITCHENAID™ Classic mixer with a paddle. The chemical leavening agents were then added, and the batter was mixed on high speed for an additional 3 minutes. The resulting dough was sticky.

Approximately 220 g of dough were poured into a pup loaf pan. The dough was proofed to approximately 1 inch above the top of the pan, at 115° F. and 85% relative humidity. The batter was then baked for 30 minutes at 430° F.

All five hydrocolloid-starch treatments resulted in an acceptable specific volume. The specific volumes of the products made with each treatment were as follows: Treatment 1 resulted in 5.9 cc/g; Treatment 2 resulted in 3.8 cc/g; Treatment 3 resulted in 6.0 cc/g; Treatment 4 resulted in 4.1 cc/g; and Treatment 5 resulted in 4.3 cc/g.

Starches

To further investigate the function of starches in the gluten-replacing composition or system of the present invention, tapioca starch and high amylose starch were evaluated, in addition to the wheat starch studied in the previous Examples. Example 4 describes the use of tapioca starch with zein or high amylose starch as the setting agent.

EXAMPLE 4

Tapioca Starch and Zein or High Amylose Starch

Tapioca starch bread was set using ethanol-solubilized zein, according to the formula of Tables 7 and 8 (see FIG. 4). The nonpolar zein fractions are likely solubilized in the ethanol, rather than plasticized. As the ethanol vaporizes during proofing and baking, the zein may harden and in turn set the breadcrumb. It is also possible that the ethanol changes the temperatures and extent of starch gelatinization by competing for water. It is likely that anything that competes for water in the dough will change the temperatures and extent of starch gelatinization, as will modifications to the tapioca starch, such as cross-linking.

TABLE 7

Softened Chewing Gum Base

| Ingredient | Percent | Mass (g) |
|---|---|---|
| Chewing gum base (PERMSOFT ™ chewing gum base, Cafosa, S.A.U., Barcelona, Spain) | 82.20 | 64.10 |
| Soybean oil (Cargill, Inc., Wayzata, MN, US) | 13.69 | 10.68 |
| Lecithin (LECIPRIME ™ lecithin, Cargill, Inc., Wayzata, MN, US) | 4.11 | 3.20 |
| Total | 100.00 | 77.98 |

TABLE 8

Tapioca Starch and Zein

| Ingredient | Percent | Mass (g) |
|---|---|---|
| Corn zein (Freeman Industries LLC, Tuckahoe, NY, US) | 6.12 | 47.90 |
| 75% Aqueous ethanol (EVERCLEAR ® alcohol, Luxco, Inc., St. Louis, MO, US) | 6.12 | 47.90 |
| Salt (Cargill, Inc., Wayzata, MN, US) | 0.10 | 0.80 |
| Sugar (Cargill, Inc., Wayzata, MN, US) | 0.10 | 0.80 |
| Softened chewing gum base (from Table 7) | 8.56 | 67.00 |
| Starch (Tapioca starch, Cream Gel 70001, Cargill, Inc., Wayzata, MN, US) | 30.67 | 240.00 |
| Glucono delta-lactone (GDL) (PURAC America Inc., Lincolnshire, IL, US) | 2.04 | 16.00 |
| Sodium bicarbonate (Church and Dwight Co., Inc., Princeton, NJ, US) | 1.02 | 8.00 |
| Water | 43.44 | 340.00 |
| Ammonium bicarbonate (Church and Dwight Co., Inc., Princeton, NJ, US) | 0.26 | 2.00 |
| Xanthan Gum (KELTROL ® HP, CP Kelco, Chicago, IL, US) | 1.27 | 10.00 |
| Diacetyl tartaric acid esters of mono- and diglycerides (Danisco, Ardsley, NY, US) | 0.13 | 1.00 |
| Azodicarbonamide ADA-PAR (BENCHMATE ™, Burns Philp Food Inc., Fenton, MO, US) | 0.01 | 0.10 |
| Ascorbic Acid PAR-C-120 (BENCHMATE ™, Burns Philp Food Inc., Fenton, MO, US) | 0.01 | 0.10 |
| Sodium stearoyl lactylate (Archer Daniels Midland Company, Decatur, IL, US) | 0.13 | 1.00 |
| Total | 100.00 | 782.60 |

To prepare the softened chewing gum base, the chewing gum base was melted completely at 200-250° C. Soybean oil and lecithin were added to emulsify and soften the melted gum base, and these ingredients were stirred until combined.

The ingredients, except for the GDL and sodium bicarbonate, were added to a bowl and mixed for 3 minutes on high speed in a KITCHENAID™ Classic mixer with a paddle. The GDL and sodium bicarbonate were then added, and the dough was mixed on high speed for an additional 3 minutes. The resulting dough was sticky.

Approximately 220 g of dough were poured into a pup loaf pan. The dough was proofed to approximately 1 inch above the top of the pan, at 115° F. and 85% relative humidity. The dough was then baked for 30 minutes at 430° F. At a time of 48 hours after baking, the specific volume of the resulting bread was 7.0 cc/g.

Tapioca starch bread was also set using high amylose (50% amylose) starch. Tables 9 and 10 provide the bread formula and FIG. 5 shows photographs of the breads.

TABLE 9

Softened Chewing Gum Base

| Ingredient | Percent | Mass (g) |
|---|---|---|
| Chewing gum base (PERMSOFT ™ chewing gum base, Cafosa, S.A.U., Barcelona, Spain) | 82.20 | 64.10 |
| Soybean oil (Cargill, Inc., Wayzata, MN, US) | 13.69 | 10.68 |
| Lecithin (LECIPRIME ™ lecithin, Cargill, Inc., Wayzata, MN, US) | 4.11 | 3.20 |
| Total | 100.00 | 77.98 |

TABLE 10

Tapioca Starch and High Amylose Starch

| Ingredient | Percent | Mass (g) |
|---|---|---|
| High amylose starch (Amylogel 03001, Cargill, Inc., Wayzata, MN, US) | 6.52 | 47.90 |
| Salt (Cargill, Inc., Wayzata, MN, US) | 0.11 | 0.80 |
| Sugar (Cargill, Inc., Wayzata, MN, US) | 0.11 | 0.80 |
| Softened chewing gum base (from Table 9) | 9.12 | 67.00 |
| Starch (Tapioca starch, Cream Gel 70001, Cargill, Inc., Wayzata, MN, US) | 32.67 | 240.00 |
| Glucono delta-lactone (GDL) (PURAC America Inc., Lincolnshire, IL, US) | 2.18 | 16.00 |
| Sodium bicarbonate (Church and Dwight Co., Inc., Princeton, NJ, US) | 1.09 | 8.00 |
| Water | 46.28 | 340.00 |

TABLE 10-continued

Tapioca Starch and High Amylose Starch

| Ingredient | Percent | Mass (g) |
|---|---|---|
| Ammonium bicarbonate (Church and Dwight Co., Inc., Princeton, NJ, US) | 0.27 | 2.00 |
| Xanthan Gum (KELTROL ® HP, CP Kelco, Chicago, IL, US) | 1.36 | 10.00 |
| Diacetyl tartaric acid esters of mono- and diglycerides (Danisco, Ardsley, NY, US) | 0.14 | 1.00 |
| Azodicarbonamide ADA-PAR (BENCHMATE ™, Burns Philp Food Inc., Fenton, MO, US) | 0.01 | 0.10 |
| Ascorbic Acid PAR-C-120 (BENCHMATE ™, Burns Philp Food Inc., Fenton, MO, US) | 0.01 | 0.10 |
| Sodium stearoyl lactylate (Archer Daniels Midland Company, Decatur, IL, US) | 0.14 | 1.00 |
| Total | 100.00 | 734.7 |

To prepare the softened chewing gum base, the chewing gum base was melted completely at 200-250° C. Soybean oil and lecithin were added to emulsify and soften the melted gum base, and these ingredients were stirred until combined.

The ingredients, except for the GDL and sodium bicarbonate, were added to a bowl and mixed for 3 minutes on high speed in a KITCHENAID™ Classic mixer with a paddle. The GDL and sodium bicarbonate were then added, and the dough was mixed on high speed for an additional 3 minutes. The resulting dough was sticky and very light in color.

Approximately 220 g of dough were poured into a pup loaf pan. The dough was proofed to approximately 1 inch above the top of the pan, at 115° F. and 85% relative humidity. The dough was then baked for 30 minutes at 430° F. The specific volume of this bread was improved by increasing the water mass to 385 g (FIG. 5). This high amylose starch set bread had a specific volume of 4.1 cc/g at 48 hrs after baking. The amylose most likely forms hydrogen bonds intermolecularly to set the breadcrumb.

Wheat starch- and tapioca starch-containing products were analyzed to study the effects of starch gelatinization on the viscosity profile of the dough, as the viscosity ultimately leads to the final product structure and quality. The analysis was conducted over a set temperature range that included temperatures that trigger starch gelatinization. Example 5 describes the results of viscosity and rheological analyses.

EXAMPLE 5

RVA and Rheology Analysis of Gluten Free Doughs Containing Chewing Gum Base, Corn Zein, and a Starch The ingredients listed in Table 11 were combined to make dough products for the analyses. Leavening agents were omitted. Relative percent values were calculated on a dry basis, and added water quantities are noted separately. WSC and TSC refer to the wheat starch and tapioca starch controls, respectively, and WST and TST refer to the wheat starch and tapioca starch treatments, respectively, that include the chewing gum base and zein. Both the gluten-free controls and treatments were compared with wheat flour gluten-containing controls (WFC), with and without xanthan gum.

TABLE 11

| Ingredient | Control WSC, TSC Mass (g) | | Treatment WST, TST Mass (g) | | Wheat Flour Control WFC Mass (g) | | WFC with Xanthan WFCwX Mass (g) | |
|---|---|---|---|---|---|---|---|---|
| | Mass (g) | % | Mass (g) | % | Mass (g) | % | Mass (g) | % |
| Chewing gum base[1] | | | 64.1 | 16.88 | | | | |
| Soybean oil[2] | 10.7 | 3.99 | 10.7 | 2.81 | 10.7 | 2.81 | 10.7 | 2.81 |
| Lecithin[3] | 3.2 | 1.20 | 3.2 | 0.84 | 3.2 | 0.84 | 3.2 | 0.84 |
| Zein[4] | | | 47.9 | 12.62 | | | | |
| Aqueous Ethanol[5] | | | | | | | | |
| Water | | | | | | | | |
| Xanthan[6] | 10.0 | 3.74 | 10.0 | 2.63 | | | 10.0 | 2.63 |
| Starch (wheat or tapioca)[7] | 240.0 | 89.66 | 240.0 | 63.21 | | | | |
| Salt[8] | 0.8 | .30 | 0.8 | 0.21 | 0.8 | 0.21 | 0.8 | 0.21 |
| DATEM[9] | 1.0 | .37 | 1.0 | 0.26 | 1.0 | 0.26 | 1.0 | 0.26 |
| Ascorbic acid[10] | 0.1 | 0.04 | 0.1 | 0.03 | 0.1 | 0.03 | 0.1 | 0.03 |
| SSL[11] | 1.0 | .37 | 1.0 | 0.26 | 1.0 | 0.26 | 1.0 | 0.26 |
| ADA[12] | 0.1 | 0.04 | 0.1 | 0.03 | 0.1 | 0.03 | 0.1 | 0.03 |

TABLE 11-continued

| Ingredient | Control WSC, TSC Mass (g) | % | Treatment WST, TST Mass (g) | % | Wheat Flour Control WFC Mass (g) | % | WFC with Xanthan WFCwX Mass (g) | % |
|---|---|---|---|---|---|---|---|---|
| Sugar[13] | 0.8 | 0.30 | 0.8 | 0.21 | 0.8 | 0.21 | 0.8 | 0.21 |
| Wheat flour[14] | | | | | 362.0 | 95.34 | 352.0 | 92.71 |
| TOTAL | 268 | 100 | 380 | 100 | 380 | 100 | 380 | 100 |

[1]PERMSOFT ™ chewing gum base, Cafosa, S.A.U., Barcelona, Spain
[2]Cargill, Inc., Wayzata, MN, US
[3]LECIPRIME ™ lecithin, Cargill, Inc., Wayzata, MN, US
[4]Corn zein, Freeman Industries LLC, Tuckahoe, NY, US
[5]75% Aqueous ethanol, EVERCLEAR ® alcohol, Luxco, Inc., St. Louis, MO, US
[6]KELTROL ® HP, CP Kelco, Chicago, IL, US
[7]AYTEX ® P wheat starch, Archer Daniels Midland Company, Decatur, IL, US, or Tapioca starch, Cream Gel 70001, Cargill, Inc., Wayzata, MN, US
[8]Cargill, Inc., Wayzata, MN, US
[9]Diacetyl tartaric acid esters of mono- and diglycerides, Danisco, Ardsley, NY, US
[10]Ascorbic Acid PAR-C-120 (BENCHMATE ™, Burns Philp Food Inc., Fenton, MO, US)
[11]Sodium stearoyl lactylate (Archer Daniels Midland Company, Decatur, IL, US)
[12]Azodicarbonamide ADA-PAR (BENCHMATE ™, Burns Philp Food Inc., Fenton, MO US)
[13]Cargill, Inc., Wayzata, MN, US
[14]Artisan, Cargill, Inc., Wayzata, MN, US Because the dough has a consistency more similar to batter, the viscosity analysis was conducted with an RVA (RAPID VISCO®) Analyzer, Newport Scientific Pty. Ltd., Warriewood, Australia), using a method known for analyzing starch gelatinization and other formulas with a batter-like consistency. The RVA continuously measures apparent viscosity under a constant shear rate and controlled heating and cooling conditions. In order for the viscosity of the dough formulations listed above to fall within the dynamic range of the instrument, the dough was diluted 2:1 with water. With this modification, it was possible to collect RVA data. Additionally, analysis of tapioca starch gelatinization with water and water/ethanol was performed using 4 g of starch and 25 g total grams of liquid. The ratio of water to ethanol used to make the treatment dough was maintained (21.9 g water, 3.1 g ethanol).

The following RVA protocol was used:
Protocol:
Mixing speed: 160 rpm
Tank temperature: 30° C.
1. Start test, hold for 30° C. for 5 minutes
2. $1^{st}$ gradient: heat to 90° C. over 10 minutes
3. Hold for 7 minutes at 90° C.
4. $2^{nd}$ gradient: cool to 50° C. over 5 minutes
5. Hold at 50° C. for 5 minutes
6. $3^{rd}$ gradient: cool to 30° C. over 4 minutes
7. Hold at 30° C. for 4 minutes
Total analysis time: 40 minutes The various stages of starch gelatinization (for starch-water mixtures) have been well characterized by RVA. In a starch-water system, typically there is a peak viscosity (where the majority of the starch granules are swollen) and then a drop (where the granules begin to break down) followed by a final increase in viscosity (typically called a setback) where the solubilized starch molecules begin to re-associate. Since the formulas used contain a large (~60 to 90%) amount of starch, it is assumed that starch makes a substantial contribution to the changes seen in the RVA graph. Deviations from the expected starch gelatinization profile are then attributed to the other ingredients, likely acting individually and synergistically. The resulting RVA curve is then a combination of all of these contributions.

Figure 6:
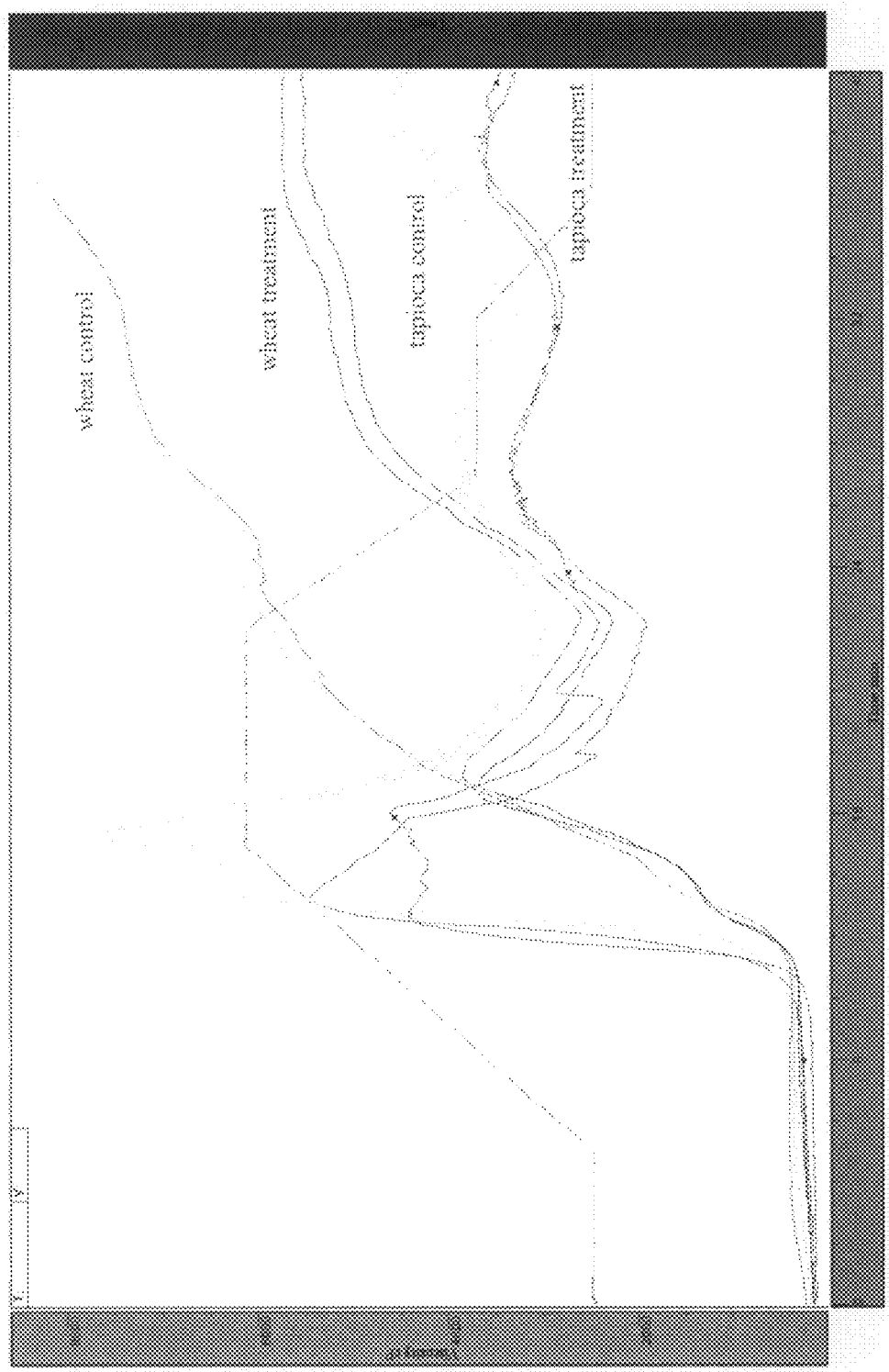
FIG. 6 shows RAPID VISCO® Analyzer (RVA) curves, in duplicate, of doughs made with wheat starch and tapioca starch. The "wheat treatment" and "tapioca treatment" curves are RVA curves of a wheat starch dough and a tapioca starch dough, respectively, wherein the doughs include chewing gum base and zein. The "wheat control" and "tapioca control" curves are RVA curves of a wheat starch dough and a tapioca starch dough, respectively, wherein the doughs do not include chewing gum base and zein.

RVA curves for wheat starch and tapioca starch doughs (control and treatment) are shown, in duplicate, in FIG. 6. In general, it has been observed that ingredients like ethanol and hydrophilic polymers (xanthan) inhibit starch gelatinization (lower peak viscosity) and final setback viscosity in wheat and tapioca starch. It may be that the inhibition of tapioca starch gelatinization partially enables the crumb to set properly, and this is surprising. It is also very likely that the zein in the tapioca starch treatment hardens and enables the crumb to set properly. Additionally, a concentration effect contributes to the observables.

Figure 7:
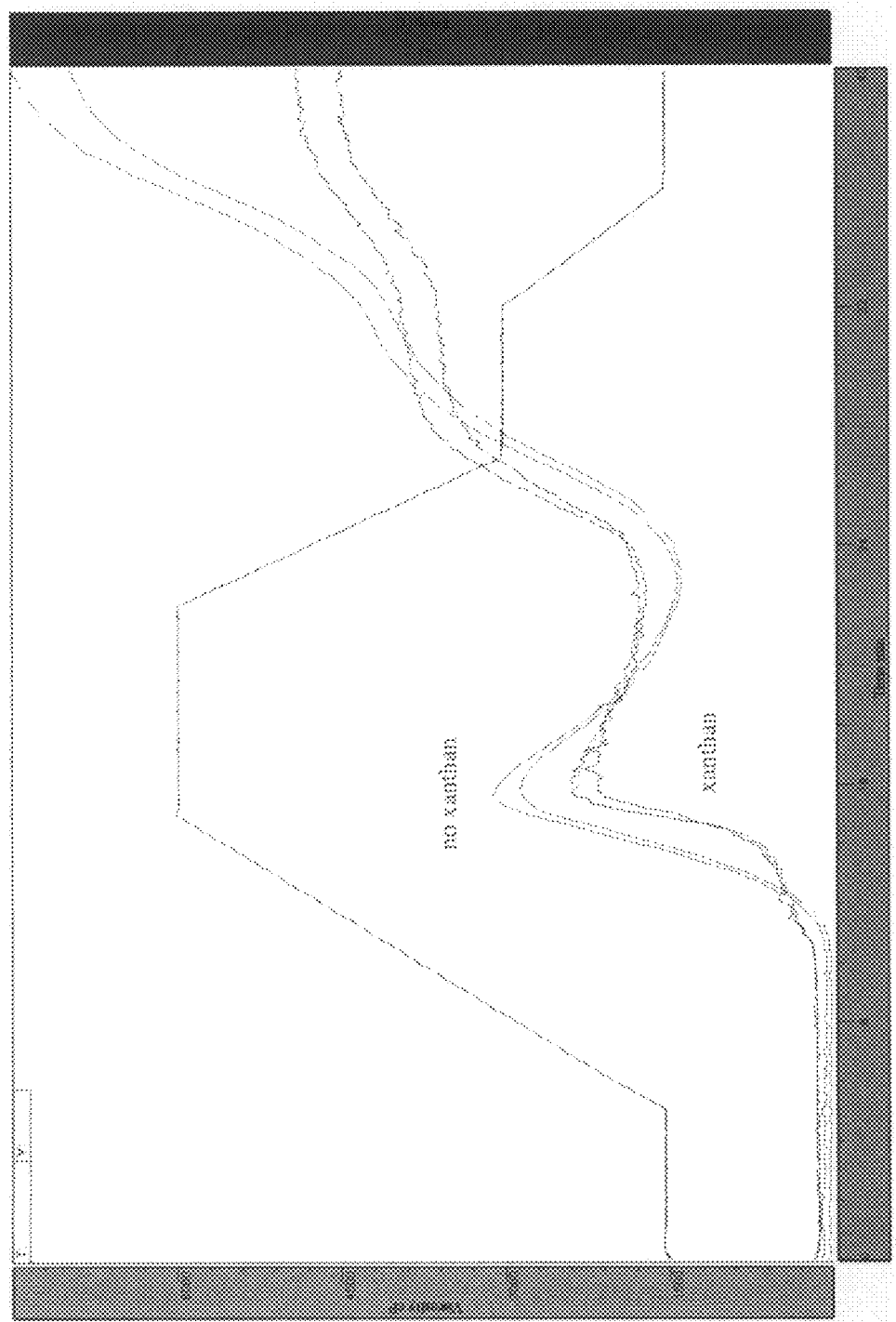
FIG. 7 shows RAPID VISCO® Analyzer (RVA) curves, in duplicate, of doughs made with wheat flour. The "xanthan" curve is an RVA curve of a wheat flour dough made with xanthan gum. The "no xanthan" curve is an RVA curve of a wheat flour dough made without xanthan gum.

RVA curves for a wheat flour-containing control, with and without xanthan gum, are shown in FIG. 7. From these curves it can be seen that the gluten-free wheat starch treatment containing chewing gum base and zein is similar to the wheat flour controls.

Because the dough products of the present invention are at least partially viscoelastic, dynamic rheological measurements, designed to measure viscoelastic properties, are well suited to characterize these doughs.

Experiments were performed on a Physica rheometer (Anton Paar Germany GmbH, Ostfildern, Germany) using a parallel plate configuration with a 1 mm gap size. The temperature was maintained at 25° C.

Amplitude/strain sweep measurements were performed using the 50 mm geometry and a shear stress range of 0.1 to 1000 Pa at an angular frequency of 10 s$^{-1}$. A disposable aluminum pan was filled with 1.5 g of sample. Excess material was trimmed immediately prior to the run to minimize drying.

The amplitude sweep test tracks changes in the storage modulus (G') and loss modulus (G") as a function of increasing shear stress. The storage and loss modulus correlate to the elastic and viscous components of the dough, respectively.

Figure 8:
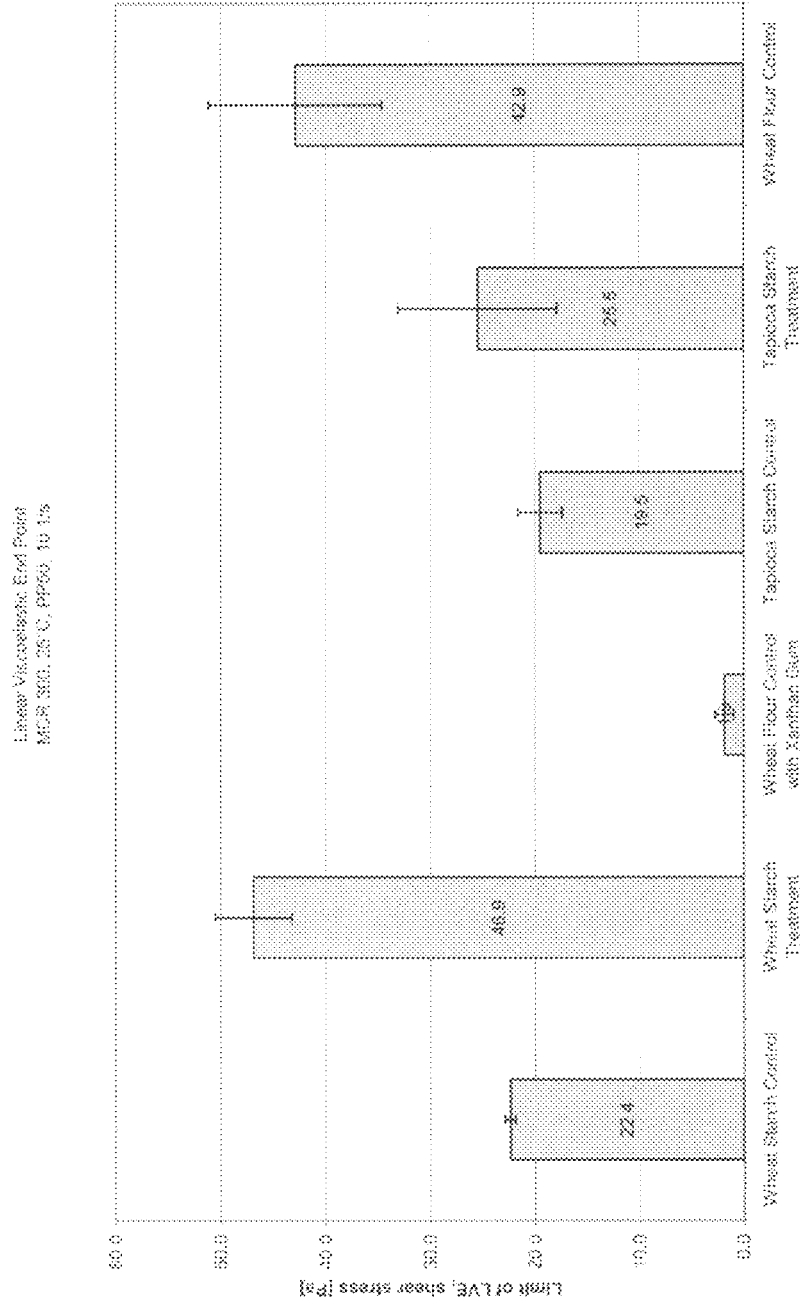
FIG. 8 is a bar graph showing the linear viscoelastic endpoint (LVE) values of doughs made with wheat starch, tapioca starch, and wheat flour.

At low shear stresses, the storage modulus is relatively flat. In this region, known as the linear viscoelastic region, the material is exhibiting viscoelastic behavior in response to the shear stress. With increasing shear stress, the material eventually can no longer behave like a viscoelastic material and begins to slip and/or flow, and linearity is lost. This is the limit of the linear viscoelastic region. The linear viscoelastic endpoint, or LVE, values for the doughs made in accordance with the present invention were calculated and shown in FIG. 8. As can be seen from this Figure, products made with the chewing gum base and zein treatment showed an increase in LVE values compared to the controls, and the wheat starch treatment formula behaved very similarly to the wheat flour control. The larger the LVE value, the more time elapsed and the larger stress induced prior to dough flowing or behaving more like a liquid. Therefore, the LVE value likely correlates with mixing tolerance and bread chewiness.

Creep experiments were performed using the 25 mm geometry. A disposable aluminum pan was filled with 1.5 g of sample. Excess material was trimmed and edges sealed with silicon oil to prevent evaporation. The instrument algorithm was programmed to allow the sample to rest for 5 minutes prior to the application of a pseudo instantaneous shear stress of 2 Pa. The stress was applied for 3 minutes and then removed. The strain response was monitored for 10 minutes following the removal of the strain. Data points were collected logarithmically (0.01 to 25 seconds).

Figure 9:
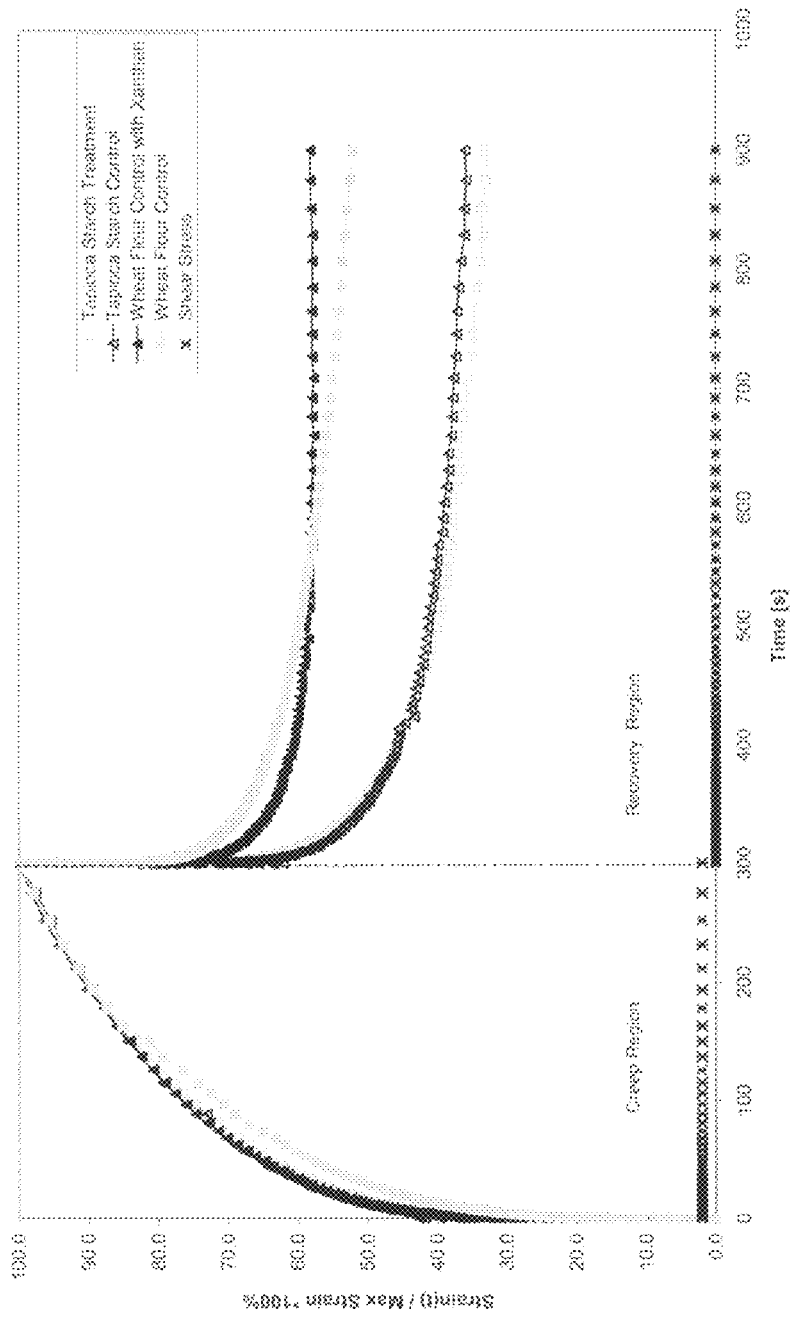
FIG. 9 is a creep-recovery test curve of doughs made with tapioca starch and wheat flour.

Differences in the large-scale architecture of the polymeric materials in the dough can be determined by creep-recovery testing. In FIG. 9, creep-recovery test curves are shown and exhibit typical viscoelastic behavior. In the creep region, there is an initial elastic response up to ~40%, followed by a viscoelastic response from ~40 to ~70% and finally a viscous-like response occurring immediately before the stress is removed. After the stress is removed (at 300 s), the material recovers. Adding xanthan to the WFC impairs recovery, which is undesirable. It has been published that a greater creep recovery leads to better dough strength and baking performance. Hydrophobic polymers like PERMSOFT™ chewing gum base and zein improve recovery in the tapioca starch treatment.

Texture Profile Analysis

Example 6 describes the texture profile analysis of various bread products made with hydrocolloids, and with hydrocolloids in combination with gas-retaining and setting polymers. Example 7 describes a total water insoluble analysis comparing a hydrocolloid-containing bakery product, a bakery product containing polymeric gas-retaining and setting agents with a hydrocolloid viscosifier, and a control gluten-containing bakery product. From these Examples, it is seen that the combination of the polymeric gas-retaining and setting agents with a viscosity-building hydrocolloid and starch in accordance with the present invention results in an exceptional gluten-free bakery product with properties very similar to those of a gluten-containing bakery product.

EXAMPLE 6

Texture Profile Analysis

Texture profile analysis (TPA) is a simple compression test that is used widely to study food product texture.

A texture analyzer (TA-XT2i Texture Analyzer, Stable Micro Systems Ltd., Scarsdale, N.Y. US) was used to run TPA on the following bread samples: a xanthan hydrophilic treatment (Table 12), a PERMSOFT™ chewing gum base-zein hydrophobic treatment with wheat starch, and a PERMSOFT™ chewing gum base-zein hydrophobic treatment with tapioca starch (Tables 13 and 14), and a wheat flour control (Table 15).

TABLE 12

| Xanthan Hydrophilic Treatment | | |
|---|---|---|
| Ingredient | Percent | Mass (g) |
| Salt (Cargill, Inc., Wayzata, MN, US) | 0.13 | 0.80 |
| Sugar (Cargill, Inc., Wayzata, MN, US) | 0.13 | 0.80 |
| Starch* (AYTEX ® P wheat starch, Archer Daniels Midland Company, Decatur, IL, US) | 37.87 | 240.00 |
| Glucono delta-lactone (GDL) (PURAC America Inc., Lincolnshire, IL, US) | 2.52 | 16.00 |
| Sodium bicarbonate (Church and Dwight Co., Inc., Princeton, NJ, US) | 1.26 | 8.00 |
| Water | 53.65 | 340 |
| Ammonium bicarbonate (Church and Dwight Co., Inc., Princeton, NJ, US) | 0.31 | 2.00 |
| Soybean oil (Cargill, Inc., Wayzata, MN, US) | 1.68 | 10.68 |
| Lecithin (LECIPRIME ™ lecithin, Cargill, Inc., Wayzata, MN, US) | 0.50 | 3.20 |
| Xanthan Gum (KELTROL ® HP, CP Kelco, Chicago, IL, US) | 1.58 | 10.00 |
| Diacetyl tartaric acid esters of mono- and diglycerides (Danisco, Ardsley, NY, US) | 0.16 | 1.00 |
| Azodicarbonamide ADA-PAR (BENCHMATE ™, Burns Philp Food Inc., Fenton, MO, US) | 0.02 | 0.10 |
| Ascorbic Acid PAR-C-120 (BENCHMATE ™, Burns Philp Food Inc., Fenton, MO, US) | 0.02 | 0.10 |
| Sodium stearoyl lactylate (Archer Daniels Midland Company, Decatur, IL, US) | 0.16 | 1.00 |
| Total | 100.00 | 633.68 |

*Codex wheat starch can be substituted for AYTEX ® P wheat starch.

The xanthan hydrophilic treatment bread was prepared as follows. The ingredients, except for the chemical leavening agents, were added to a bowl and mixed for 3 minutes on high speed in a KITCHENAID™ Classic mixer with a paddle. The chemical leavening agents were then added, and the dough was mixed on high speed for an additional 3 minutes. The resulting dough was sticky.

Approximately 220 g of dough were poured into a pup loaf pan. The dough was proofed to approximately 1 inch above the top of the pan, at 115° F. and 85% relative humidity. The dough was then baked for 30 minutes at 430° F. A significant amount of oven spring occurred. The specific volume of the resulting bread was 6.4 cc/g.

TABLE 13

Softened Chewing Gum Base

| Ingredient | Percent | Mass (g) |
|---|---|---|
| Chewing gum base (PERMSOFT ™ chewing gum base, Cafosa, S.A.U., Barcelona, Spain) | 82.20 | 64.10 |
| Soybean oil (Cargill, Inc., Wayzata, MN, US) | 13.69 | 10.68 |
| Lecithin (LECIPRIME ™ lecithin, Cargill, Inc., Wayzata, MN, US) | 4.11 | 3.20 |
| Total | 100.00 | 77.98 |

The PERMSOFT™ chewing gum base-zein hydrophobic treatment breads were prepared as follows. The softened chewing gum base was prepared by melting the chewing gum base completely at 200-250° C. Soybean oil and lecithin were added to the chewing gum base, and the mixture was stirred until combined.

Zein, salt, and sugar were dissolved in EVERCLEAR® alcohol. The resulting solution was combined with the softened chewing gum base. Cold water was then added to the mixture to precipitate softened chewing gum and zein, until the mixture was no longer sticky (approximately two minutes). The remaining ingredients, except for the chemical leavening agents, were added to the mixture and mixed for 3 minutes on high speed in a KITCHENAID™ Classic mixer with paddle. Finally, the chemical leavening agents were added, and the dough was mixed on high speed for an additional 3 minutes. The resulting dough was sticky.

Approximately 220 g of dough were poured into a pup loaf pan. The dough was proofed to approximately 1 inch above the top of the pan, at 115° F. and 85% relative humidity. The dough was subsequently baked for 30 minutes at 430° F. A significant amount of oven spring occurred. The specific volume of the resulting breads was 6.6 cc/g.

TABLE 14

PERMSOFT ™ chewing gum base-zein hydrophobic treatment with wheat starch and tapioca starch

| Ingredient | Percent | Mass (g) |
|---|---|---|
| Corn zein (Freeman Industries LLC, Tuckahoe, NY, US) | 6.12 | 47.90 |
| 75% Aqueous ethanol (EVERCLEAR ® alcohol, Luxco, Inc., St. Louis, MO, US) | 6.12 | 47.90 |
| Salt (Cargill, Inc., Wayzata, MN, US) | 0.10 | 0.80 |
| Sugar (Cargill, Inc., Wayzata, MN, US) | 0.10 | 0.80 |
| Softened chewing gum base (from Table 13) | 8.56 | 67.00 |
| Starch* (AYTEX ® P wheat starch, Archer Daniels Midland Company, Decatur, IL, US) or Starch (Tapioca starch, Cream Gel 70001, Cargill, Inc., Wayzata, MN, US) | 30.67 | 240.00 |
| Glucono delta-lactone (GDL) (PURAC America Inc., Lincolnshire, IL, US) | 2.04 | 16.00 |
| Sodium bicarbonate (Church and Dwight Co., Inc., Princeton, NJ, US) | 1.02 | 8.00 |
| Water | 43.44 | 340 |
| Ammonium bicarbonate (Church and Dwight Co., Inc., Princeton, NJ, US) | 0.26 | 2.00 |
| HPMC (METHOCEL ® K4M, Dow Chemical Co., Midland, MI, US) | 0.00 | 0.00 |
| MC (METHOCEL ® A4M, Dow Chemical Co., Midland, MI, US) | 0.00 | 0.00 |
| Xanthan Gum (KELTROL ® HP, CP Kelco, Chicago, IL, US) | 1.28 | 10.00 |
| Diacetyl tartaric acid esters of mono- and diglycerides (Danisco, Ardsley, NY, US) | 0.13 | 1.00 |
| Azodicarbonamide ADA-PAR (BENCHMATE ™, Burns Philp Food Inc., Fenton, MO, US) | 0.01 | 0.10 |
| Ascorbic Acid PAR-C-120 (BENCHMATE ™, Burns Philp Food Inc., Fenton, MO, US) | 0.01 | 0.10 |
| Sodium stearoyl lactylate (Archer Daniels Midland Company, Decatur, IL, US) | 0.13 | 1.00 |
| Total | 100.00 | 782.6 |

*Codex wheat starch can be substituted for AYTEX ® P wheat starch.

TABLE 15

Wheat Flour Control

| Ingredient | Percent | Mass (g) |
| --- | --- | --- |
| Soybean oil (Cargill, Inc., Wayzata, MN, US) | 1.35 | 10.68 |
| Lecithin (LECIPRIME ™ lecithin, Cargill, Inc., Wayzata, MN, US) | 0.40 | 3.20 |
| Salt (Cargill, Inc., Wayzata, MN, US) | 0.10 | 0.80 |
| Sugar (Cargill, Inc., Wayzata, MN, US) | 0.10 | 0.80 |
| Wheat Flour (Artisan, Cargill, Inc., Wayzata, MN, US) | 44.41 | 352.00 |
| Glucono delta-lactone (GDL) (PURAC America Inc., Lincolnshire, IL, US) | 2.02 | 16.00 |
| Sodium bicarbonate (Church and Dwight Co., Inc., Princeton, NJ, US) | 1.01 | 8.00 |
| Water | 48.82 | 387 |
| Ammonium bicarbonate (Church and Dwight Co., Inc., Princeton, NJ, US) | 0.25 | 2.00 |
| Xanthan Gum (KELTROL ® HP, CP Kelco, Chicago, IL, US) | 1.26 | 10.00 |
| Diacetyl tartaric acid esters of mono- and diglycerides (Danisco, Ardsley, NY, US) | 0.13 | 1.00 |
| Azodicarbonamide ADA-PAR (BENCHMATE ™, Burns Philp Food Inc., Fenton, MO, US) | 0.01 | 0.10 |
| Ascorbic Acid PAR-C-120 (BENCHMATE ™, Burns Philp Food Inc., Fenton, MO, US) | 0.01 | 0.10 |
| Sodium stearoyl lactylate (Archer Daniels Midland Company, Decatur, IL, US) | 0.13 | 1.00 |
| Total | 100.00 | 792.68 |

The wheat flour control bread was prepared as follows. The ingredients, except for the chemical leavening agents, were added to a bowl and mixed for 3 minutes on high speed in a KITCHENAID™ Classic mixer with a paddle. The chemical leavening agents were then added, and the dough was mixed on high speed for an additional 3 minutes. The resulting dough was sticky.

Approximately 220 g of dough were poured into a pup loaf pan. The dough was proofed to approximately 1 inch above the top of the pan, at 115° F. and 85% relative humidity. The dough was then baked for 30 minutes at 430° F. A significant amount of oven spring occurred. The specific volume of the resulting bread was >4 cc/g.

The texture analyzer was equipped with a 5 kg load cell and a round 2 in diameter compression platen probe. The bread samples were sliced into 1 in square by 0.5 in thick pieces. The TPA program compressed each piece to 50% of its original height at a constant speed of 1 mm/s. After the initial compression, the probe retracted 5 mm and then compressed to 50% of the original height.

Figure 10:
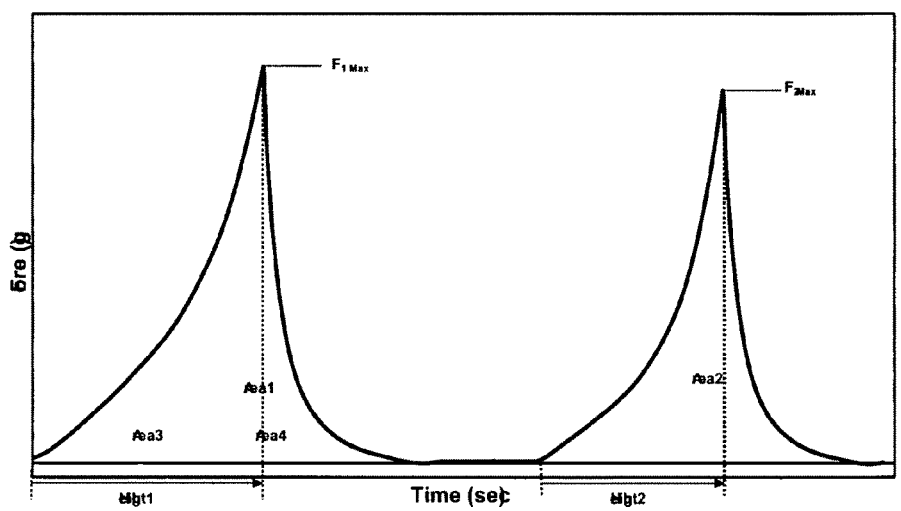
FIG. 10 is a typical Texture Profile Analysis curve.

A typical TPA curve is shown in FIG. 10. From the TPA curve, texture parameters can be calculated using the method of Bourne (Food Technology, volume 32(7):62-66 (1978)). Texture parameters of interest include gumminess and chewiness as defined in Cereal Chemistry, volume 83(6):684 (2006).

Gumminess=($F$1 Max)×(Area2/Area1)

Chewiness=($F$1 Max)×(Area2/Area1)×(Height2/Height1)

The TPA results are listed in Table 16. The results suggest that the tapioca starch, PERMSOFT™ chewing gum base-zein hydrophobic treatment is closer in texture to the wheat flour control than the hydrophilic treatment. There is no significant difference between the wheat starch and xanthan treatments, which may be attributed to differences in crumb structure. In general, results from TPA suggest that hydrophobic polymers like chewing gum base and zein can improve the texture of gluten-free bread.

TABLE 16

Texture Profile Analysis Results

| Sample | Gumminess g | Chewiness g |
| --- | --- | --- |
| Wheat Flour Control (Table 15) | 63.1 | 59.2 |
| Tapioca Starch, PERMSOFT ™ chewing gum base-Zein Hydrophobic Treatment (Tables 13 and 14) | 69.5 | 43.5 |
| Wheat Starch, PERMSOFT ™ chewing gum base-Zein Hydrophobic Treatment (Tables 13 and 14) | 27.1 | 21.2 |
| Xanthan Hydrophilic Treatment (Table 12) | 28.2 | 25.3 |

Water Solubility

Although texture profile analysis provides valuable information, one major drawback is that water-soluble and insoluble components are treated equally in TPA, which is not true when these components are being consumed in the mouth. To analyze the differences between water soluble and water insoluble components, the following analysis was done.

EXAMPLE 7

Total Water Insolubles

A total water insoluble analysis was conducted on the following breads: a xanthan treatment (Table 17), a PERMSOFT™ chewing gum base-zein hydrophobic treatment (Tables 18 and 19), and a commercial WONDER® Classic white bread (Interstate Bakeries Corporation, Kansas City, Mo. US).

TABLE 17

Xanthan Treatment

| Ingredient | Percent | Mass (g) |
| --- | --- | --- |
| Salt (Cargill, Inc., Wayzata, MN, US) | 0.13 | 0.80 |
| Sugar (Cargill, Inc., Wayzata, MN, US) | 0.13 | 0.80 |
| Starch* (AYTEX ® P wheat starch, Archer Daniels Midland Company, Decatur, IL, US) | 37.87 | 240.00 |
| Glucono delta-lactone (GDL) (PURAC America Inc., Lincolnshire, IL, US) | 2.52 | 16.00 |
| Sodium bicarbonate (Church and Dwight Co., Inc., Princeton, NJ, US) | 1.26 | 8.00 |
| Water | 53.65 | 340 |
| Ammonium bicarbonate (Church and Dwight Co., Inc., Princeton, NJ, US) | 0.31 | 2.00 |
| Soybean oil (Cargill, Inc., Wayzata, MN, US) | 1.68 | 10.68 |
| Lecithin (LECIPRIME ™ lecithin, Cargill, Inc., Wayzata, MN, US) | 0.50 | 3.20 |
| Xanthan Gum (KELTROL ® HP, CP Kelco, Chicago, IL, US) | 1.58 | 10.00 |
| Diacetyl tartaric acid esters of mono- and diglycerides (Danisco, Ardsley, NY, US) | 0.16 | 1.00 |
| Azodicarbonamide ADA-PAR (BENCHMATE ™, Burns Philp Food Inc., Fenton, MO, US) | 0.02 | 0.10 |
| Ascorbic Acid PAR-C-120 (BENCHMATE ™, Burns Philp Food Inc., Fenton, MO, US) | 0.02 | 0.10 |
| Sodium stearoyl lactylate (Archer Daniels Midland Company, Decatur, IL, US) | 0.16 | 1.00 |
| Total | 100.00 | 633.68 |

*Codex wheat starch can be substituted for AYTEX ® P wheat starch.

The xanthan treatment bread was prepared as follows. The ingredients, except for the chemical leavening agents, were added to a bowl and mixed for 3 minutes on high speed in a KITCHENAID™ Classic mixer with a paddle. The chemical leavening agents were then added, and the dough was mixed on high speed for an additional 3 minutes. The resulting dough was sticky.

Approximately 220 g of dough were poured into a pup loaf pan. The dough was proofed to approximately 1 inch above the top of the pan, at 115° F. and 85% relative humidity. The dough was then baked for 30 minutes at 430° F. A significant amount of oven spring occurred. The specific volume of the resulting bread was 6.4 cc/g.

TABLE 18

Softened Chewing Gum Base

| Ingredient | Percent | Mass (g) |
| --- | --- | --- |
| Chewing gum base (PERMSOFT ™ chewing gum base, Cafosa, S.A.U., Barcelona, Spain) | 82.20 | 64.10 |
| Soybean oil (Cargill, Inc., Wayzata, MN, US) | 13.69 | 10.68 |
| Lecithin (LECIPRIME ™ lecithin, Cargill, Inc., Wayzata, MN, US) | 4.11 | 3.20 |
| Total | 100.00 | 77.98 |

TABLE 19

PERMSOFT ™ chewing gum base-zein Hydrophobic Treatment

| Ingredient | Percent | Mass (g) |
| --- | --- | --- |
| Corn zein (Freeman Industries LLC, Tuckahoe, NY, US) | 6.12 | 47.90 |
| 75% Aqueous ethanol (EVERCLEAR ® alcohol, Luxco, Inc., St. Louis, MO, US) | 6.12 | 47.90 |
| Salt (Cargill, Inc., Wayzata, MN, US) | 0.10 | 0.80 |
| Sugar (Cargill, Inc., Wayzata, MN, US) | 0.10 | 0.80 |
| Softened chewing gum base (from Table 18) | 8.56 | 67.00 |
| Starch* (AYTEX ® P wheat starch, Archer Daniels Midland Company, Decatur, IL, US) | 30.67 | 240.00 |
| Glucono delta-lactone (GDL) (PURAC America Inc., Lincolnshire, IL, US) | 2.04 | 16.00 |
| Sodium bicarbonate (Church and Dwight Co., Inc., Princeton, NJ, US) | 1.02 | 8.00 |
| Water | 43.44 | 340 |
| Ammonium bicarbonate (Church and Dwight Co., Inc., Princeton, NJ, US) | 0.26 | 2.00 |
| HPMC (METHOCEL ® K4M, Dow Chemical Co., Midland, MI, US) | 0.00 | 0.00 |
| MC (METHOCEL ® A4M, Dow Chemical Co., Midland, MI, US) | 0.00 | 0.00 |
| Xanthan Gum (KELTROL ® HP, CP Kelco, Chicago, IL, US) | 1.28 | 10.00 |
| Diacetyl tartaric acid esters of mono- and diglycerides (Danisco, Ardsley, NY, US) | 0.13 | 1.00 |
| Azodicarbonamide ADA-PAR (BENCHMATE ™, Burns Philp Food Inc., Fenton, MO, US) | 0.01 | 0.10 |

TABLE 19-continued

PERMSOFT™ chewing gum base-zein Hydrophobic Treatment

| Ingredient | Percent | Mass (g) |
|---|---|---|
| Ascorbic Acid PAR-C-120 (BENCHMATE™, Burns Philp Food Inc., Fenton, MO, US) | 0.01 | 0.10 |
| Sodium stearoyl lactylate (Archer Daniels Midland Company, Decatur, IL, US) | 0.13 | 1.00 |
| Total | 100.00 | 782.6 |

*Codex wheat starch can be substituted for AYTEX ® P wheat starch.

The PERMSOFT™ chewing gum base-zein hydrophobic treatment breads were prepared as follows. The softened chewing gum base was prepared by melting the chewing gum base completely at 200-250° C. Soybean oil and lecithin were added to the chewing gum base, and the mixture was stirred until combined.

Zein, salt, and sugar were dissolved in EVERCLEAR® alcohol. The resulting solution was combined with the softened chewing gum base. Cold water was then added to the mixture to precipitate softened chewing gum and zein, until the mixture was no longer sticky (approximately two minutes). The remaining ingredients, except for the chemical leavening agents, were added to the mixture and mixed for 3 minutes on high speed in a KITCHENAID™ Classic mixer with paddle. Finally, the chemical leavening agents were added, and the dough was mixed on high speed for an additional 3 minutes. The resulting dough was sticky.

Approximately 220 g of dough were poured into a pup loaf pan. The dough was proofed to approximately 1 inch above the top of the pan, at 115° F. and 85% relative humidity. The dough was subsequently baked for 30 minutes at 430° F. A significant amount of oven spring occurred. The specific volume of the resulting breads was 6.6 cc/g.

To examine total water insolubles, a modification of the method of B. L. D'Appolonia (Comparison of Pentosans Extracted from Conventional and Continuous Bread, Cereal Chemistry, volume 50(1):27-36 (1973) was used. Approximately 25 g of breadcrumb were mixed with 600 mL of distilled water in a Hamilton Beach blender at high speed for 3 min. The solution was centrifuged using a JLA 8.1000 rotor at 7000 rpm for 60 min at 20° C. The supernatant was decanted and the pellet (total water insolubles) examined.

The xanthan treatment had a homogeneous pellet (FIG. 11). The pellet consistency was white and cream-like. It is believed that this pellet was predominantly gelatinized starch.

The PERMSOFT™ chewing gum base-zein hydrophobic treatment and the commercial WONDER® Classic white bread had heterogeneous pellets. Both pellets had a white, cream-like phase (similar to the xanthan treatment pellet) and a more rubbery phase. In the case of the PERMSOFT™ chewing gum base-zein hydrophobic treatment, the rubbery phase was yellow from the zein (FIG. 11). The rubbery phase was tan and resembled hydrated gluten in the commercial WONDER® Classic white bread pellet (FIG. 11).

It is believed that the rubbery phase of the total water insolubles is responsible for the characteristic chewy texture of bread, because it cannot dissolve in the mouth and because it undergoes reversible deformations during mastication due to its rubbery nature.

Further Modifications

Other Polymers

Viscosity-building polymers can also achieve the desired viscosity profiles described above. The viscosity-building polymer can also have gas-retaining or setting properties, or both, or can be used in addition to gas-retaining polymers and setting polymers, as described above. Either synthetic or natural polymers, having the desired viscosity-building effect, can be used in accordance with the present invention.

One common viscosity-building polymer is polyethylene oxide, or PEO. An example of a PEO-enhanced bakery product is described in Example 8.

EXAMPLE 8

Polyethylene Oxide

A batter was prepared according to the formula of Tables 20 and 21. The softened chewing gum base was prepared by melting the chewing gum base completely at 200-250° C. Soybean oil and lecithin were added to the chewing gum base, and the mixture was stirred until combined.

TABLE 20

Softened Chewing Gum Base

| Ingredient | Percent | Mass (g) |
|---|---|---|
| Chewing gum base (PERMSOFT™ chewing gum base, Cafosa, S.A.U., Barcelona, Spain) | 82.20 | 64.10 |
| Soybean oil (Cargill, Inc., Wayzata, MN, US) | 13.69 | 10.68 |
| Lecithin (LECIPRIME™ lecithin, Cargill, Inc., Wayzata, MN, US) | 4.11 | 3.20 |
| Total | 100.00 | 77.98 |

TABLE 21

Polyethylene Oxide Treatment

| Ingredient | Percent | Mass (g) |
|---|---|---|
| Corn zein (Freeman Industries LLC, Tuckahoe, NY, US) | 6.81 | 47.90 |
| 75% Aqueous ethanol (EVERCLEAR ® alcohol, Luxco, Inc., St. Louis, MO, US) | 6.81 | 47.90 |
| Salt (Cargill, Inc., Wayzata, MN, US) | 0.11 | 0.80 |
| Sugar (Cargill, Inc., Wayzata, MN, US) | 0.11 | 0.80 |
| Softened chewing gum base (from Table 20) | 9.52 | 67.00 |

TABLE 21-continued

Polyethylene Oxide Treatment

| Ingredient | Percent | Mass (g) |
|---|---|---|
| Starch* (AYTEX ® P wheat starch, Archer Daniels Midland Company, Decatur, IL, US) | 34.11 | 240.00 |
| Glucono delta-lactone (GDL) (PURAC America Inc., Lincolnshire, IL, US) | 2.27 | 16.00 |
| Sodium bicarbonate (Church and Dwight Co., Inc., Princeton, NJ, US) | 1.14 | 8.00 |
| Water | 35.67 | 251.00 |
| Ammonium bicarbonate (Church and Dwight Co., Inc., Princeton, NJ, US) | 0.28 | 2.00 |
| Poly(ethylene oxide) (MW 7 million, 372811, Sigma-Aldrich, Inc., St. Louis, MO, US) | 2.84 | 20.00 |
| Diacetyl tartaric acid esters of mono- and diglycerides (Danisco, Ardsley, NY, US) | 0.14 | 1.00 |
| Azodicarbonamide ADA-PAR (BENCHMATE ™, Burns Philp Food Inc., Fenton, MO, US) | 0.01 | 0.10 |
| Ascorbic Acid PAR-C-120 (BENCHMATE ™, Burns Philp Food Inc., Fenton, MO, US) | 0.01 | 0.10 |
| Sodium stearoyl lactylate (Archer Daniels Midland Company, Decatur, IL, US) | 0.14 | 1.00 |
| Total | 100.00 | 703.60 |

*Codex wheat starch can be substituted for AYTEX ® P wheat starch.

Zein, salt, and sugar were dissolved in EVERCLEAR® alcohol. The resulting solution was combined with the softened chewing gum base. Cold water was then added to the mixture to precipitate softened chewing gum and zein, until the mixture was no longer sticky (approximately two minutes). The remaining ingredients, except for the chemical leavening agents, were added to the mixture and mixed for 3 minutes on high speed in a KITCHENAID™ Classic mixer with paddle. Finally, the chemical leavening agents were added, and the batter was mixed on high speed for an additional 3 minutes. The resulting batter was sticky.

Approximately 220 g of batter were poured into a pup loaf pan. The batter was proofed to approximately 0.75 inch above the top of the pan, at 115° F. and 85% relative humidity. The batter was subsequently baked for 30 minutes at 430° F.

Figure 12:
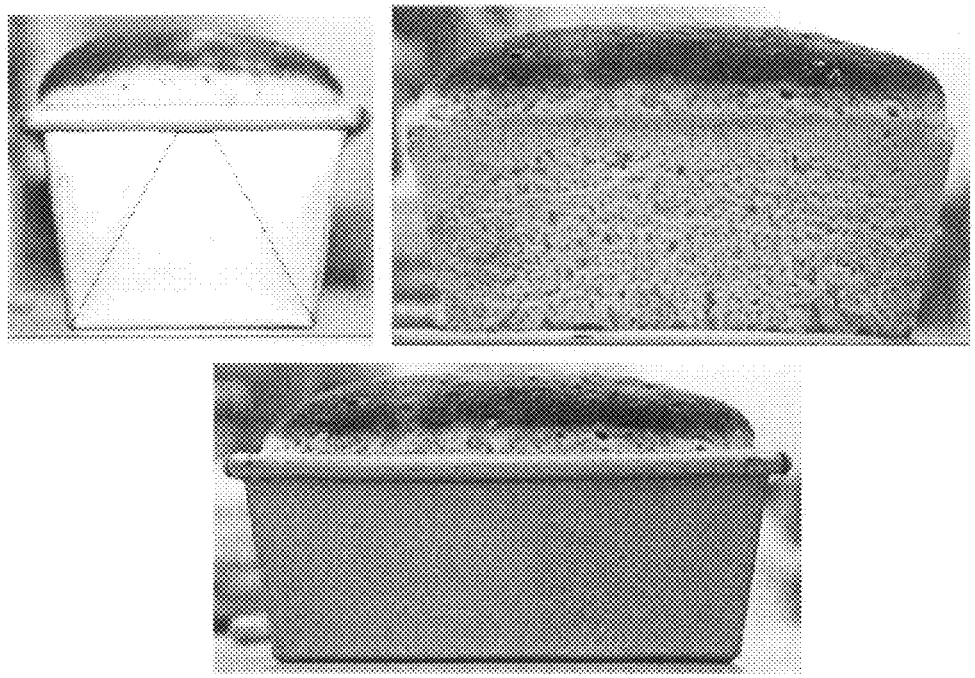
FIG. 12 shows end and side views of a loaf of bread made with polyethylene oxide.

A modest amount of oven spring occurred (FIG. 12). Further optimization of the polymer properties, such as molecular weight, degree of branching, degree of cross-linking, degree of crystallization, and side and/or end group modification, and modifying batter moisture level will likely result in greater oven spring. The final bread specific volume was acceptable (4.3 cc/g). The breadcrumb was soft and chewy. Hydrophilic synthetic polymers like high-molecular-weight PEO function adequately as viscosifiers in bread-making.

Natural Chewing Gum Base

Other gum bases are suitable for use as the gas-retaining agent of the present invention. Example 9 describes the use of natural chicle gum base and zein as the gluten replacement system.

EXAMPLE 9

Natural Chicle Chewing Gum Base

A bread was prepared according to the formula of Tables 22 and 23. The chicle was treated similarly to the synthetic PERMSOFT™ chewing gum base. The softened chewing gum base was prepared by melting the chewing gum base completely at 200-250° C. Soybean oil and lecithin were added to the chewing gum base, and the mixture was stirred until combined.

TABLE 22

Softened Chewing Gum Base

| Ingredient | Percent | Mass (g) |
|---|---|---|
| Chewing gum base (Chicle gum base, Verve, Inc., distributed by Schylling Associates Inc., Rowley, MA, US) | 82.20 | 64.10 |
| Soybean oil (Cargill, Inc., Wayzata, MN, US) | 13.69 | 10.68 |
| Lecithin (LECIPRIME ™ lecithin, Cargill, Inc., Wayzata, MN, US) | 4.11 | 3.20 |
| Total | 100.00 | 77.98 |

TABLE 23

Natural Chicle Chewing Gum Base Treatment

| Ingredient | Percent | Mass (g) |
|---|---|---|
| Corn zein (Freeman Industries LLC, Tuckahoe, NY, US) | 6.12 | 47.90 |
| 75% Aqueous ethanol (EVERCLEAR ® alcohol, Luxco, Inc., St. Louis, MO, US) | 6.12 | 47.90 |
| Salt (Cargill, Inc., Wayzata, MN, US) | 0.10 | 0.80 |
| Sugar (Cargill, Inc., Wayzata, MN, US) | 0.10 | 0.80 |
| Softened chewing gum base (from Table 22) | 8.56 | 67.00 |
| Starch* (AYTEX ® P wheat starch, Archer Daniels Midland Company, Decatur, IL, US) | 30.67 | 240.00 |

TABLE 23-continued

Natural Chicle Chewing Gum Base Treatment

| Ingredient | Percent | Mass (g) |
|---|---|---|
| Glucono delta-lactone (GDL) (PURAC America Inc., Lincolnshire, IL, US) | 2.04 | 16.00 |
| Sodium bicarbonate (Church and Dwight Co., Inc., Princeton, NJ, US) | 1.02 | 8.00 |
| Water | 43.44 | 340 |
| Ammonium bicarbonate (Church and Dwight Co., Inc., Princeton, NJ, US) | 0.26 | 2.00 |
| HPMC (METHOCEL ® K4M, Dow Chemical Co., Midland, MI, US) | 0.00 | 0.00 |
| MC (METHOCEL ® A4M, Dow Chemical Co., Midland, MI, US) | 0.00 | 0.00 |
| Xanthan Gum (KELTROL ® HP, CP Kelco, Chicago, IL, US) | 1.28 | 10.00 |
| Diacetyl tartaric acid esters of mono- and diglycerides (Danisco, Ardsley, NY, US) | 0.13 | 1.00 |
| Azodicarbonamide ADA-PAR (BENCHMATE ™, Burns Philp Food Inc., Fenton, MO, US) | 0.01 | 0.10 |
| Ascorbic Acid PAR-C-120 (BENCHMATE ™, Burns Philp Food Inc., Fenton, MO, US) | 0.01 | 0.10 |
| Sodium stearoyl lactylate (Archer Daniels Midland Company, Decatur, IL, US) | 0.13 | 1.00 |
| Total | 100.00 | 782.6 |

*Codex wheat starch can be substituted for AYTEX ® P wheat starch.

Zein, salt, and sugar were dissolved in EVERCLEAR® alcohol. The resulting solution was combined with the softened chewing gum base. Cold water was then added to the mixture to precipitate softened chewing gum and zein, until the mixture was no longer sticky (approximately two minutes). The remaining ingredients, except for the chemical leavening agents, were added to the mixture and mixed for 3 minutes on high speed in a KITCHENAID™ Classic mixer with paddle. Finally, the chemical leavening agents were added, and the dough was mixed on high speed for an additional 3 minutes. The resulting dough was sticky.

Approximately 220 g of dough were poured into a pup loaf pan. The batter was proofed to approximately 1 inch above the top of the pan, at 115° F. and 85% relative humidity. The dough was subsequently baked for 30 minutes at 430° F.

A significant amount of oven spring occurred. The specific volume of the bread was 5.7 cc/g (FIG. 13). The bread remained soft and stable (set) for at least 24 hours after baking.

Aqueous Zein

To minimize excessive specific volume and an undesirable yellowish color, ethanol-solubilized zein can be replaced with an aqueous, plasticized zein product, such as AQUA ZEIN NEUTRAL™ solution, which is 10% zein, 75% propylene glycol, and 14% water (available from Freeman Industries LLC, New York). Example 10 describes the use of aqueous zein in the gluten replacement system of the present invention.

EXAMPLE 10

Aqueous Zein

A dough was prepared based on the formula of Tables 24 and 25. The softened chewing gum base was prepared by melting the chewing gum base completely at 200-250° C. Soybean oil and lecithin were added to the chewing gum base, and the mixture was stirred until combined.

TABLE 24

Softened Chewing Gum Base

| Ingredient | Percent | Mass (g) |
|---|---|---|
| Chewing gum base (PERMSOFT ™ chewing gum base, Cafosa, S. A. U., Barcelona, Spain) | 82.20 | 64.10 |
| Soybean oil (Cargill, Inc., Wayzata, MN, US) | 13.69 | 10.68 |
| Lecithin (LECIPRIME ™ lecithin, Cargill, Inc., Wayzata, MN, US) | 4.11 | 3.20 |
| Total | 100.00 | 77.98 |

TABLE 25

Aqueous Zein

| Ingredient | Percent | Mass (g) |
|---|---|---|
| AQUA ZEIN NEUTRAL ™ solution (Freeman Industries LLC, Tuckahoe, NY, US) | 6.52 | 47.90 |
| Salt (Cargill, Inc., Wayzata, MN, US) | 0.11 | 0.80 |
| Sugar (Cargill, Inc., Wayzata, MN, US) | 0.11 | 0.80 |
| Softened chewing gum base (from Table 24) | 9.12 | 67.00 |
| Starch* (AYTEX ® P wheat starch, Archer Daniels Midland Company, Decatur, IL, US) | 32.67 | 240.00 |
| Glucono delta-lactone (GDL) (PURAC America Inc., Lincolnshire, IL, US) | 2.18 | 16.00 |
| Sodium bicarbonate (Church and Dwight Co., Inc., Princeton, NJ, US) | 1.09 | 8.00 |

TABLE 25-continued

Aqueous Zein

| Ingredient | Percent | Mass (g) |
|---|---|---|
| Water | 46.28 | 340 |
| Ammonium bicarbonate (Church and Dwight Co., Inc., Princeton, NJ, US) | 0.27 | 2.00 |
| MC (METHOCEL ® A4M, Dow Chemical Co., Midland, MI, US) | 1.36 | 10.00 |
| Diacetyl tartaric acid esters of mono- and diglycerides (Danisco, Ardsley, NY, US) | 0.14 | 1.00 |
| Azodicarbonamide ADA-PAR (BENCHMATE ™, Burns Philp Food Inc., Fenton, MO, US) | 0.01 | 0.10 |
| Ascorbic Acid PAR-C-120 (BENCHMATE ™, Burns Philp Food Inc., Fenton, MO, US) | 0.01 | 0.10 |
| Sodium stearoyl lactylate (Archer Daniels Midland Company, Decatur, IL, US) | 0.14 | 1.00 |
| Total | 100.00 | 772.6 |

*Codex wheat starch can be substituted for AYTEX ® P wheat starch.

Figure 14:
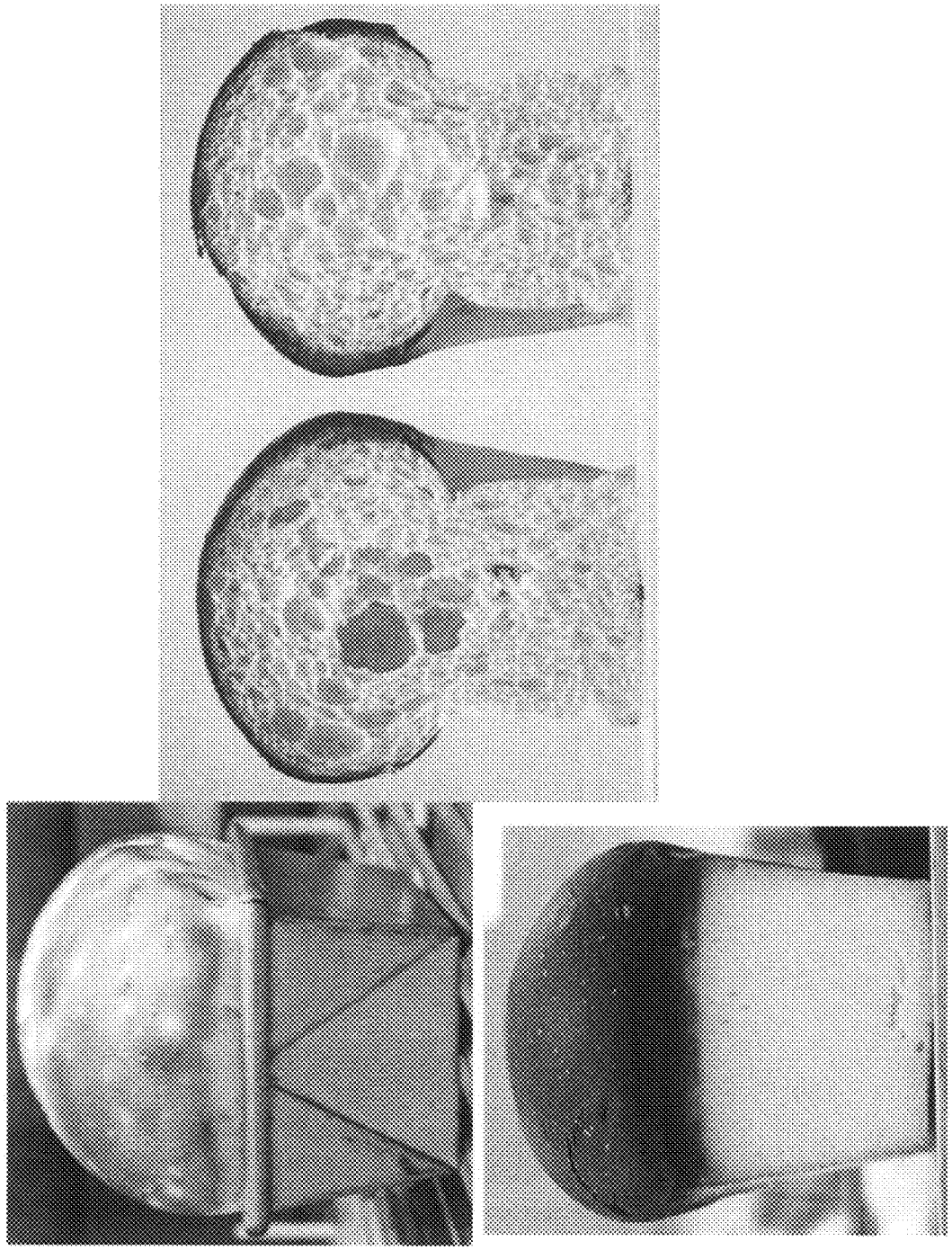
FIG. 14 shows end and cross-sectional views of a loaf of bread made with aqueous zein.
Figure 15:
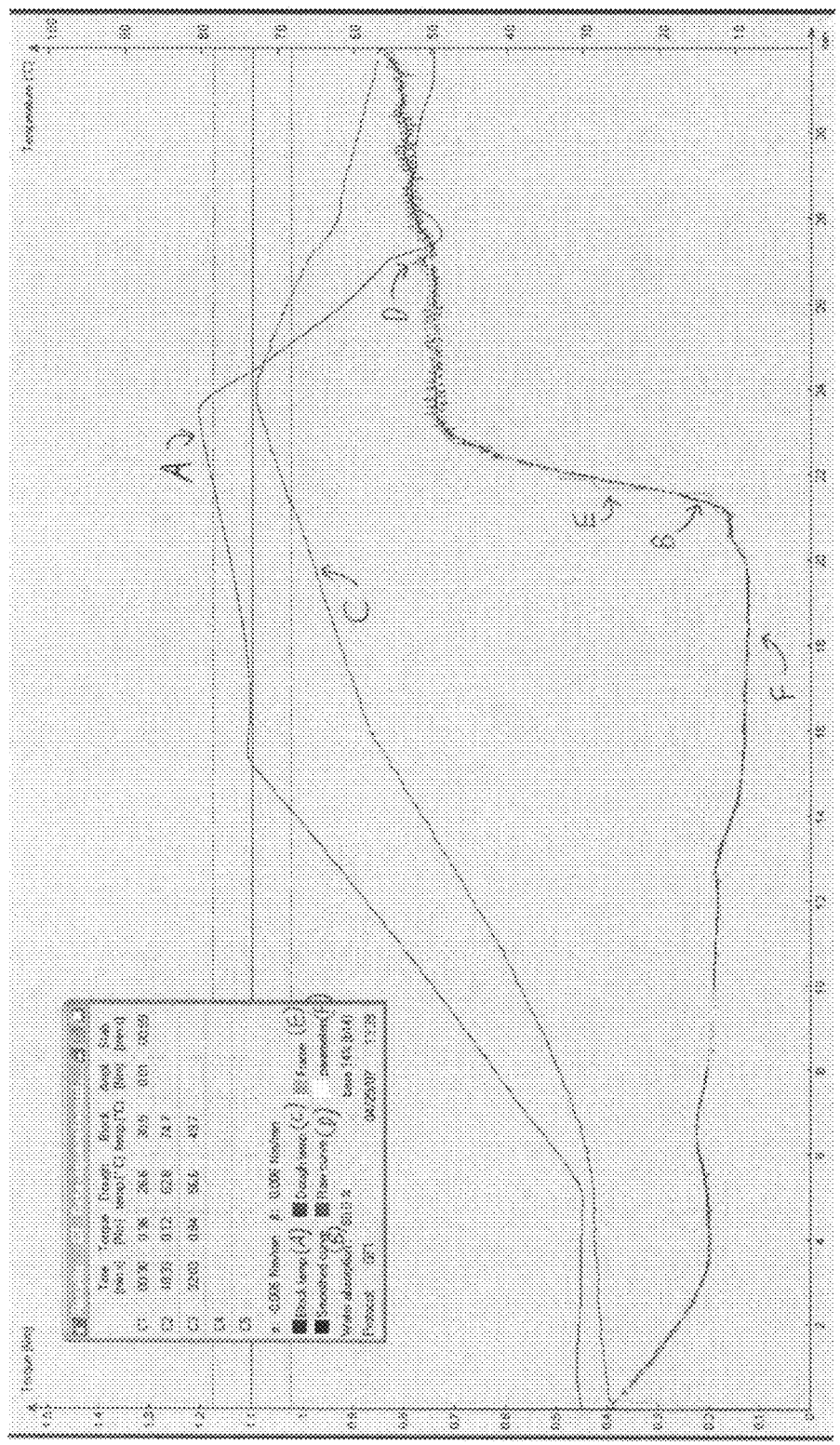
FIG. 15 is a MIXOLAB™ curve of a dough made with aqueous zein.

The aqueous zein was combined with the softened chewing gum base by mixing on high speed for 1 minute in a KITCHENAID™ Classic mixer with a paddle, and then precipitated in cold water for 2 minutes. The dough was prepared with the remaining ingredients, and was baked into a loaf for 30 minutes at 430° F. The resulting bread had a specific volume of 5.4 cc/g, and is shown in FIG. 14. A MIXOLAB™ curve of a dough prepared according to the formula of Tables 24 and 25 is shown in FIG. 15.

It was discovered that the pH of all dough formulations can be lowered to reduce loaf browning by reducing the amount of sodium bicarbonate and ammonium bicarbonate, preferably by one-half.

In addition, there are other ways to plasticize zein and thereby eliminate ethanol from the formulation. In particular, glycerol and lactic acid each work well when followed by cold-water precipitation. Glycerol results in a more soluble zein than lactic acid, but the lactic acid is in an 85% aqueous solution. A combination of 50:50 glycerol:lactic acid solution (aqueous) can be used to plasticize zein. Cold-water precipitation of the resulting mass provides a material with viscoelastic properties that are similar to, but weaker than, gluten. The material traps gas and hardens upon heating.

Yeast-leavened Products

By eliminating the ethanol from the formula as described above, it is possible to use yeast as the leavening agent, either alone or in combination with chemical leavening agents. The use of yeast in the dough formulation results in the desired properties associated with a yeast-leavened product, such as flavor and aroma. Example 11 describes a yeast-leavened gluten-free bakery product made in accordance with the present invention.

EXAMPLE 11

Yeast-leavened Dough

A dough was made in accordance with the formula in Tables 26 and 27. The softened chewing gum base was prepared by melting the chewing gum base completely at 200-250° C. Soybean oil and lecithin were added to the chewing gum base, and the mixture was stirred until combined.

TABLE 26

Softened Chewing Gum Base

| Ingredient | Percent | Mass (g) |
|---|---|---|
| Chewing gum base (PERMSOFT ™ chewing gum base, Cafosa, S.A.U., Barcelona, Spain) | 82.20 | 64.10 |
| Soybean oil (Cargill, Inc., Wayzata, MN, US) | 13.69 | 10.68 |
| Lecithin (LECIPRIME ™ lecithin, Cargill, Inc., Wayzata, MN, US) | 4.11 | 3.20 |
| Total | 100.00 | 77.98 |

TABLE 27

Yeast Treatment

| Ingredient | Percent | Mass (g) |
|---|---|---|
| AQUA ZEIN NEUTRAL ™ solution (Freeman Industries LLC, Tuckahoe, NY, US) | 7.11 | 47.90 |
| Compressed yeast (Baker's Select, FLEISCHMANN'S ® Yeast, AB Mauri Food Inc., Chesterfield, MO, US) | 3.71 | 25.00 |
| Salt (Cargill, Inc., Wayzata, MN, US) | 0.18 | 1.20 |
| Dextrose (Cargill, Wayzata) | 3.71 | 25.00 |
| Softened chewing gum base (from Table 26) | 9.95 | 67.00 |
| Starch* (AYTEX ® P wheat starch, Archer Daniels Midland Company, Decatur, IL, US) | 35.64 | 240.00 |
| Water | 37.13 | 250.00 |
| MC (METHOCEL ® A4M, Dow Chemical Co., Midland, MI, US) | 1.04 | 7.00 |
| Xanthan Gum (KELTROL ® HP, CP Kelco, Chicago, IL, US) | 1.19 | 8.00 |
| Diacetyl tartaric acid esters of mono- and diglycerides (Danisco, Ardsley, NY, US) | 0.15 | 1.00 |
| Azodicarbonamide ADA-PAR (BENCHMATE ™, Burns Philp Food Inc., Fenton, MO, US) | 0.01 | 0.10 |

TABLE 27-continued

| Yeast Treatment | | |
|---|---|---|
| Ingredient | Percent | Mass (g) |
| Ascorbic Acid PAR-C-120 (BENCHMATE ™, Burns Philp Food Inc., Fenton, MO, US) | 0.01 | 0.10 |
| Sodium stearoyl lactylate (Archer Daniels Midland Company, Decatur, IL, US) | 0.15 | 1.00 |
| Total | 100.00 | 673.3 |

*Codex wheat starch can be substituted for AYTEX ® P wheat starch.

The softened chewing gum base was combined with AQUA ZEIN NEUTRAL™ solution by mixing for 1 minute on high speed in a KITCHENAID™ Classic mixer with paddle. Cold water was then added to the mixture to precipitate softened chewing gum and zein, until the mixture was no longer sticky (approximately two minutes). The remaining ingredients, except for the yeast, were added to the mixture and mixed with the paddle for 3 minutes on high speed in a KITCHENAID™ Classic mixer. Finally, the yeast was added, and the dough was mixed on high speed for an additional 3 minutes. The resulting dough was sticky, and had a very light color.

Approximately 220 g of dough were poured into a pup loaf pan. The batter was proofed to approximately 1 inch above the top of the pan, at 115° F. and 85% relative humidity. The dough was subsequently baked for 30 minutes at 430° F.

Figure 17:
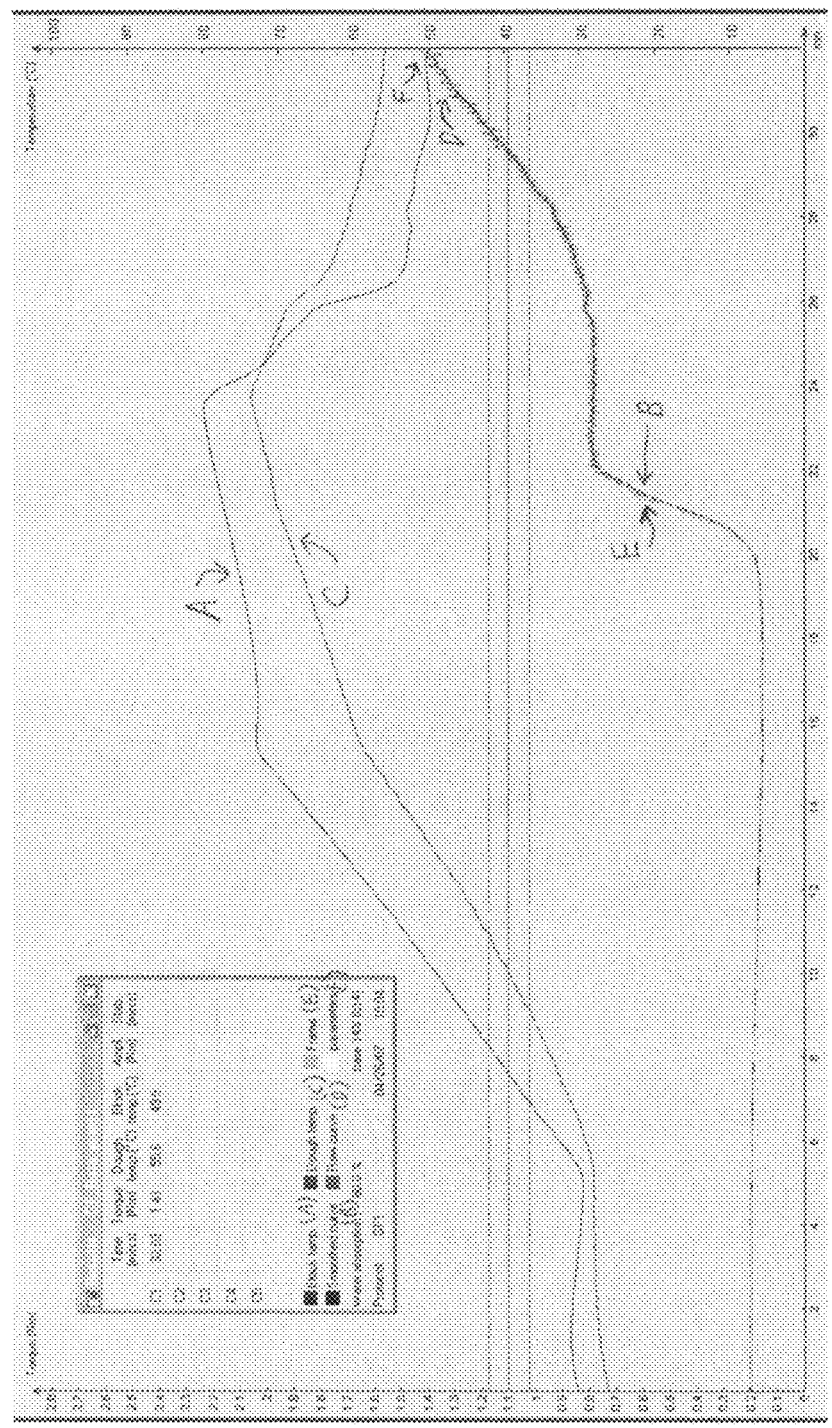
FIG. 17 is a MIXOLAB™ curve of a yeast-leavened dough.

This treatment proofed to height and had oven spring. The specific volume of the bread was 4.5 cc/g, which was acceptable. Views of the bread are shown in FIG. 16. A MIXOLAB™ curve of a dough prepared according to the formula of Tables 26 and 27 is shown in FIG. 17.

X-Ray Analysis of Gluten-Free Bread

In order to evaluate the crumb structures of bread samples, x-ray tomography (X-ray CAT) was used. X-ray CAT is a non-destructive analytical method that utilizes the penetration of x-rays to probe internal structures of cell wall materials. Depending on the structure, x-rays are absorbed and/or scattered resulting in density variations.

In tomography, two-dimensional (2D) image planes are collected as the sample is rotated. The series of collected image planes are then processed using an algorithm designed to convert the series of 2D transmission images into structural images in the orthogonal plane. The 2D image slices may then be reconstructed into a 3D volumetric rendering of the object, where the gray scale intensity at a given volumetric element (voxel) is inversely proportional to the density of the material contained in that voxel. The acquisition and reconstruction of image data to generate a 3D representation of a sample is known as computer aided tomography (CAT).

Seven loaves of bread (2 commercial breads and 5 bread products made in accordance with the present invention) were evaluated. The samples were prepared from frozen loaves that were sectioned into approximately 1 cm×1 cm×1 cm cubes with a sharp blade. Three or four replicates of each sample in size were analyzed. All data were collected on a SkyScan X-ray Tomograph (SkyScan, Kontich, Belgium).

The samples were exposed to 80 keV x-rays. Images were collected using 20× magnification and then compiled using the manufacturer's software. Top-down composite images were used for quantification and analyzed through a z-series for each sample. With the exception of sample 4, the voxel size is 15 μm×15 μm×30 μm. Sample 4 was run at a voxel size of 19 μm×19 μm×38 μm. All of the data collected was statistically significant. The average values for the replicates were used for analysis.

To calculate the average cell diameter, the software inserts an imaginary sphere into each structure and expands it until it touches the edges. The diameter of this sphere was then measured and reported as the size of the feature. The average cell wall thickness was extracted by analyzing the grayscale image and then scoring each pixel between 0 (white) and 255 (black). The same threshold was applied to all of the samples. When there was more than one bin tied for the mode, the higher of the two was taken.

Average cell diameters and cell wall thicknesses, and the standard deviations, were calculated and are shown in Table 28.

TABLE 28

| Sample | Cell wall diameter (μm) | Std. dev. | Cell wall thickness (μm) | Std. dev. |
|---|---|---|---|---|
| WONDER ® Classic white bread | 117 | 5.8 | 147 | 4.5 |
| Levain artisan bread (Rustica, L.L.C., Minneapolis, MN, US) | 264 | 3.5 | 264 | 1.7 |
| Example 2 | 59 | 6.0 | 205 | 3.4 |
| Example 3 Treatment 1 | 117 | 4.5 | 264 | 2.0 |
| Example 3 Treatment 3 | 192 | 4.2 | 269 | 3.0 |
| Example 10 AQUA ZEIN NEUTRAL ™ Treatment | 147 | 4.1 | 264 | 2.7 |
| Example 11 Yeast Treatment | 205 | 3.0 | 205 | 2.2 |

With the exception of Example 2, the cell size mode of the gluten-free bread products made in accordance with the present invention fall at or between the values of the commercial WONDER® Classic white bread and the commercial artisan bread (Levain artisan bread, Rustica, L.L.C., Minneapolis, Minn. US). Example 2 did not contain the gas-retaining polymer or the gas-setting polymer of the present invention. With the exception of Example 3, Treatment 3, the cell wall thickness mode of the gluten-free bread products of the present invention all fall between the values of the commercial WONDER® Classic white bread and the commercial artisan bread. Example 3, Treatment 3, has slightly different binning mode, and the difference in cell wall thickness is therefore due to the difference in multiplier based on voxel size. This would equate to the 264 μm bin, and is therefore within the range defined by the commercial products. The commercial WONDER® Classic white bread has a comparatively small average cell diameter and thin cell wall, while the commercial artisan bread has a comparatively large average cell diameter and thick cell wall. These two commercial gluten-containing products are examples of the range of acceptable structures of bread products, and the data indicate that the gluten-free bread products made in accordance with the present invention fall within the acceptable ranges of these desired parameters.

Microscopic Analysis of Gluten-Free Bread

To further elucidate the mechanisms of action of the gluten-replacing system of the present invention, microscopic analysis was conducted on several control products that contain gluten, and on gluten-free products made in accordance with the present invention.

As discussed previously, gluten provides both the strength and flexibility to stabilize gas cells in the dough as the ingredients are being mixed, and provides the continuous phase in the final product as the dough is baked and the gluten undergoes strain hardening. To provide a suitable gluten-free product, such as a bakery product, it is therefore desirable to replicate these different and important functions of gluten.

While not intending to be bound by theory, it is believed that the polymeric setting agent, such as zein, helps to create and stabilize air cells within the dough matrix. It is believed that zein, hydrated hydrocolloids like xanthan, or other setting agents that are hydrophobic in nature are conducive to the formation of cells, as air is also believed to be hydrophobic.

The gas-retaining polymer, such as chewing gum base, is believed to contribute to the amorphous continuous or semi-continuous phase. Histological analysis has demonstrated that the chewing gum base exists as an amorphous form in the gluten-free products of the present invention. This amorphous form of the chewing gum base makes up the substantially continuous phase of the product and provides the functionality of the chewing gum base in a gluten replacement system of the present invention.

To evaluate the gluten-free products of the present invention, light microscopy was used to differentiate and identify various regions of the product. To prepare the samples for sectioning, the following method was developed. The bread was stored in the freezer (18° C.) until it was frozen. The bread was then removed from the freezer and cut with a sharp razor blade into cubes 5-10 mm per dimension. Then a section ~2 mm thick was sliced from a flat face. The section was then placed in the bottom of an intermediate size plastic TISSUE-TEK® CRYOMOLD® mold (Electron Microscopy Sciences, Hatfield, Pa. US). TISSUE-TEK® O.C.T. compound (Electron Microscopy Sciences, Hatfield, Pa. US) was used to cover the sample. A thin piece of cork (1-2 mm) was used to seal the bread-O.C.T. inside the CRYOMOLD® mold. The CRYOMOLD® mold and its contents were left at room temperature for 15 minutes to allow the O.C.T. to infuse into the bread matrix. It was then frozen to ~20° C. and sectioned into 10 micron sections. FROSTBITE® coolant (Surgipath Medical Industries, Inc., Richmond, Ill. US) was used to freeze the newly exposed surface immediately before sectioning (this was critical for the samples containing chewing gum base); otherwise, the sample would deform while being sectioned. COLORMARK™ Plus slides (available from Triangle Biomedical Sciences, Durham, N.C. US) were used. The positive charge of the slide encouraged adhesion between the microtomed bread section and glass microscope slide. After sectioning, samples were stored in the refrigerator. Prior to staining, the samples were removed from the refrigerator and allowed to equilibrate to room temperature. Iodine and methylene blue, polychromatic stains, were used to stain individual components within the bread samples. Dilute 1N iodine solution was utilized to differentiate starch, zein, and xanthan gun. Similarly, dilute 1% solution of methylene blue stain was employed to visualize xanthan gum and amorphous regions of the gum base. COVERWELL™ imaging chambers (Electron Microscopy Sciences, Hatfield, Pa. US) were used to contain the sections and any applied liquids or stains.

Figure 18:
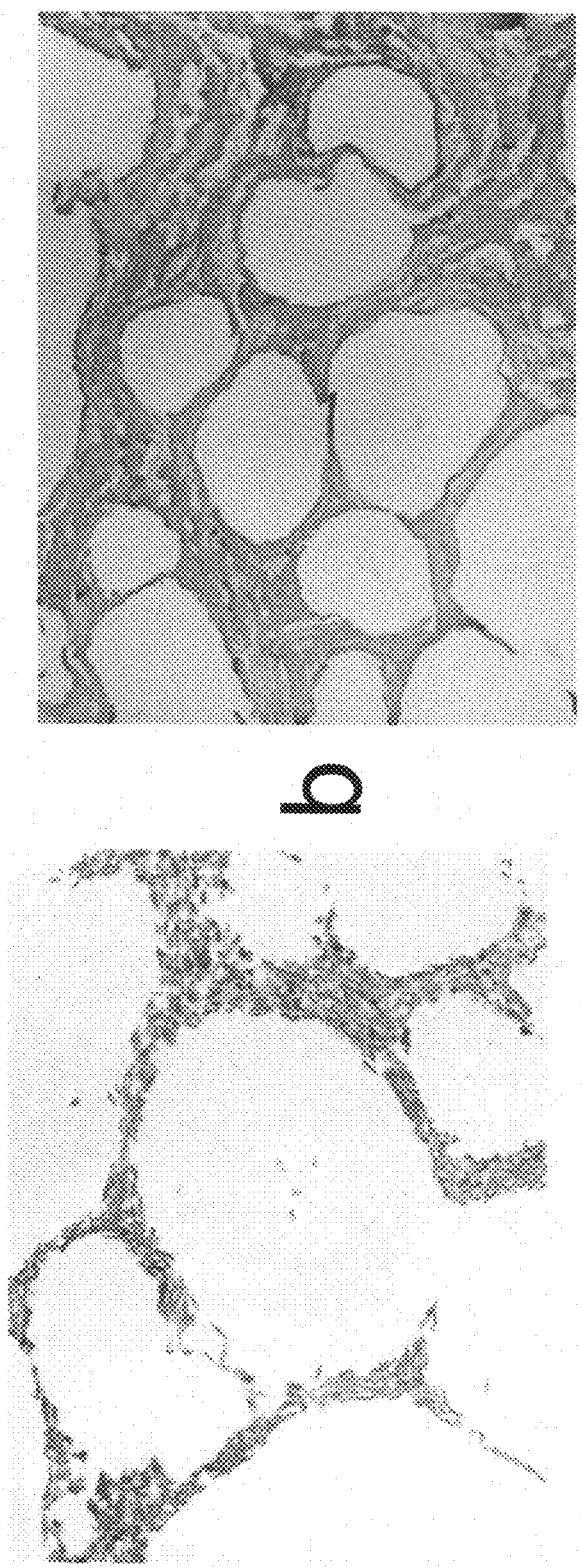
FIGS. 18a-b show light microscope images of iodine-stained gluten-containing commercial breads, at a 4× magnification level.

FIGS. 18a and 18b show light microscope images of iodine-stained gluten-containing commercial breads. FIG. 18a is an image of WONDER® Classic white bread, and FIG. 18b is an image of a gluten-containing artisan bread (Levain artisan bread, Rustica, L.L.C., Minneapolis, Minn. US).

Figure 19:
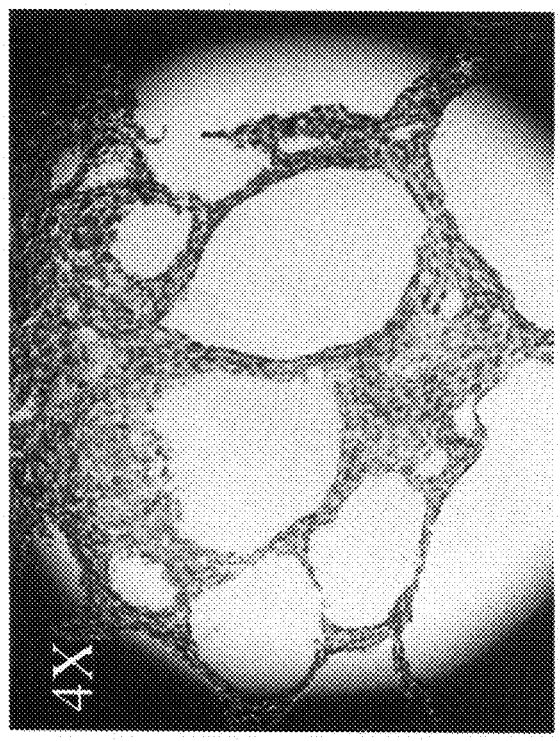
FIG. 19 shows a light microscope image of iodine-stained gluten-free bread made in accordance with the present invention, at a 4× magnification level.

FIG. 19 shows a light microscope image of iodine-stained gluten-free bread made in accordance with the present invention. As can be seen from this figure, the gluten replacement system of the present invention results in a product having a structure at the microscopic level that is very similar to that of a gluten-containing product shown in FIGS. 18a and 18b. Further histological analysis of the product shown in FIG. 19 confirmed that the air cell wall contains primarily zein, and that the continuous regions are primarily made up of the chewing gum base in its amorphous form.

As discussed above, products made in accordance with the present invention are made with non-glutenaceous ingredients, and are therefore suitable for use by those individuals with gluten allergic, intolerant or sensitive disorders, and by those who are on a gluten-free diet for medical or non-medical reasons. The products of the present invention enable such individuals to manage or treat their gluten-related symptoms, and enable them to enjoy nutritious, organoleptically pleasing food products that very closely resemble gluten-containing products, while maintaining a gluten-free diet.

Although the foregoing specification and examples fully disclose and enable the present invention, they are not intended to limit the scope of the invention, which is defined by the claims appended hereto.

What is claimed is:

1. A gluten-free bread product comprising a starch, a gluten-free gas-retaining polymer selected from the group consisting of butadiene-styrene rubber, butyl rubber, paraffin, petroleum wax, polyethylene polyisobutylene, polyvinyl acetate, poly-1-vinylpyrrolidone-co-vinyl acetate copolymer, polyvinyl alcohol, polyethylene glycol, polyethylene oxide, polyacrylic acid, Sapotaceae, Apocynaceae, Moraceae, Euphorbiaceae, and a gluten-free setting polymer selected from the group consisting of polylactic acid, polyvinyl alcohol, corn zein, and polycaprolactone, said bread product having a specific volume of about 4.0 cc/g to about 6.0 cc/g.

2. A method of making a gluten-free bread product, comprising the steps of:
    combining a starch, a gluten-free gas-retaining polymer selected from the group consisting of butadiene-styrene rubber, butyl rubber, paraffin, petroleum wax, polyethylene polyisobutylene, polyvinyl acetate, poly-1-vinylpyrrolidone-co-vinyl acetate copolymer, polyvinyl alcohol, polyethylene glycol, polyethylene oxide, polyacrylic acid, Sapotaceae, Apocynaceae, Moraceae, Euphorbiaceae, and a gluten-free setting polymer selected from the group consisting of polylactic acid, polyvinyl alcohol, corn zein, and polycaprolactone, and
    baking the starch and combined polymers for a time sufficient to produce the bread product,
    said bread product having a specific volume of about 4.0 cc/g to about 6.0 cc/g.

3. The bread product of claim 1, which additionally contains a hydrocolloid.

4. The bread product of claim 3, wherein the hydrocolloid is a linear and neutral hydrocolloid, a linear and charged hydrocolloid, or a combination thereof.

5. The bread product of claim 4, wherein the linear and charged hydrocolloid is selected from the group consisting of pectin, low ester pectin, alginate, propylene glycol alginate, carrageenan, agar, xanthan gum, gellan gum, carboxymethyl cellulose, and a combination thereof.

6. The bread product of claim 4, wherein the linear and neutral hydrocolloid is selected from the group consisting of microcrystalline cellulose, methyl cellulose, hydroxypropyl methyl cellulose, hydroxypropyl cellulose, amylose, guar, locust bean gum, tara, konjac, and a combination thereof.

* * * * *